US011231364B2

(12) United States Patent
Brown et al.

(10) Patent No.: US 11,231,364 B2
(45) Date of Patent: Jan. 25, 2022

(54) OPTICAL TURBULENCE MEASUREMENT

(71) Applicant: The Johns Hopkins University, Baltimore, MD (US)

(72) Inventors: David M. Brown, Ellicott City, MD (US); Randall T. Hanna, Ellicott City, MD (US); Kevin C. Baldwin, Baltimore, MD (US); Andrea M. Brown, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/010,007

(22) Filed: Sep. 2, 2020

(65) Prior Publication Data
US 2021/0404956 A1 Dec. 30, 2021

Related U.S. Application Data

(60) Provisional application No. 62/968,432, filed on Jan. 31, 2020.

(51) Int. Cl.
  *G01N 21/41* (2006.01)
  *G01N 21/53* (2006.01)

(52) U.S. Cl.
  CPC ... *G01N 21/538* (2013.01); *G01N 2201/0636* (2013.01); *G01N 2201/06113* (2013.01)

(58) Field of Classification Search
  CPC ........... H04N 5/23258; H04N 5/23212; G02B 7/285; G01N 21/41; G01N 21/538; G01N 2021/4106; G01N 2021/4113
  USPC ................. 356/121–137, 445–448, 601–623
  See application file for complete search history.

(56) References Cited

U.S. PATENT DOCUMENTS

| | | | | |
|---|---|---|---|---|
| 5,303,024 | A * | 4/1994 | Thierman | G01N 21/41 250/225 |
| 6,496,252 | B1 * | 12/2002 | Whiteley | G01N 21/41 356/121 |
| 8,253,932 | B1 * | 8/2012 | Cole | G01N 21/41 356/128 |

OTHER PUBLICATIONS

Shadrian B. Strong, Andrea M. Brown, "Developing a broad spectrum atmospheric aerosol characterization for remote sensing platforms over desert regions," Proc. SPIE 9071, Infrared Imaging Systems: Design, Analysis, Modeling, and Testing XXV, 907115 (Jun. 9, 2014).

(Continued)

*Primary Examiner* — Hoa Q Pham
(74) *Attorney, Agent, or Firm* — Todd R. Farnsworth

(57) ABSTRACT

An optical turbulence measurement system may include a camera assembly, a first optics assembly, a second optics assembly, and processing circuitry. The first optics assembly and the second optics assembly may be configured to magnify and direct a portion of a source beam received by a respective aperture to the camera assembly to be received as a two portions of a received beam. The processing circuitry may be configured to receive, from the camera assembly, a data representation of a first received beam from the first optics assembly and a second received beam from the second optics assembly, determine a focal spot displacement variance based on motion of a first focal spot corresponding to the first received beam relative to a second focal spot corresponding to the second received beam, and measure optical turbulence along a path of the source beam based on the focal spot displacement variance.

20 Claims, 12 Drawing Sheets

(56) References Cited

OTHER PUBLICATIONS

C. Russell Philbrick, "Raman lidar measurements of atmospheric properties," Proc. SPIE 2222, Atmospheric Propagation and Remote Sensing III, (Jun. 29, 1994).

Gary G. Gimmestad, Martha W. Dawsey, David A. Roberts, John M. Stewart, Jack W. Wood, Frank D. Eaton, "LIDAR system for monitoring turbulence profiles," Proc. SPIE 6267, Ground-based and Airborne Telescopes, 62671V (Jun. 23, 2006).

C. A. Martin, D. M. Brown, M. E. Thomas, S. Strong, Michele B. Lohr, "FTIR characterization of atmospheric fluctuations along slant paths," Proc. SPIE 9071, Infrared Imaging Systems: Design, Analysis, Modeling, and Testing XXV, 907117 (May 29, 2014).

Steve Hammel, David Wayne, Colin Reinhardt, "Investigation of scintillometer designs for dynamic path measurement," Proc. SPIE 9224, Laser Communication and Propagation through the Atmosphere and Oceans III, 92240S (Oct. 7, 2014).

M. Sarazin and F. Roddier, "The ESO differential image motion monitor," Astron. Astrophys. 227, 294-300 (1990).

David M. Brown, Juan C. Juarez, and Andrea M. Brown, "Laser differential image-motion monitor for characterization of turbulence during free-space optical communication tests," Appl. Opt. vol. 52, No. 34, 8402-8410 (2013).

Juan C. Juarez, Katherine T. Souza, Natalie G. Bos, Andrea M. Brown, Brice M. Cannon, Keith G. Petrillo, James L. Riggins II, Joseph E. Sluz, Hala J. Tomey, Radha A. Venkat, "Lasercomm system development for highbandwidth terrestrial communications," Proc. SPIE 9833, Atmospheric Propagation XIII, 98330A (May 13, 2016).

A. Tokovinin, "From differential image motion to seeing," Publ. Astron. Soc. Pac. 114, 1156-1166 (2002).

Juan C. Juarez, David M. Brown, David W. Young, "Strehl ratio simulation results under strong turbulence conditions for actively compensated freespace optical communication systems," Proc. SPIE 8732, Atmospheric Propagation X, 873207 (May 17, 2013).

Larry C. Andrews, Ronald L. Phillips, "Monostatic propagation channel enhanced backscatter effects: a comparison of refractive spectral models," Proc. SPIE 2828, Image Propagation through the Atmosphere, (Oct. 14, 1996).

Frank D Eaton, William A Peterson, John R Hines, James J Drexler, Arthur H Waldie, David B Soules, "Comparison Of Two Techniques For Determining Atmospheric Seeing," Proc. SPIE 0926, Optical, Infrared, Millimeter Wave Propagation Engineering, (Aug. 10, 1988).

Kevin Baldwin, Randall Hanna, Andrea Brown, David Brown, Steven Moyer, Jonathan G. Hixson, "Initial test of MITA/DIMM with an operational CBP system," Proc. SPIE 10625, Infrared Imaging Systems: Design, Analysis, Modeling, and Testing XXIX, 106250J (May 4, 2018).

Robert W. Lee and Jeffrey C. Harp, "Weak Scattering in Random Media, with Applications to Remote Probing," Proceedings of the IEEE, vol. 57 No. 4, Apr. 1969.

S. F. Clifford, G. R. Ochs, and R. S. Lawrence, "Saturation of optical scintillation by strong turbulence*," J. Opt. Soc. Am. 64, 148-154 (1974).

Ting-i Wang, G. R. Ochs, and S. F. Clifford, "A saturation-resistant optical scintillometer to measure Cn2," J. Opt. Soc. Am. 68, 334-338 (1978).

Matthew R. Whiteley, "Rytov parameter estimation by use of differential-tilt measurements," Proc. SPIE 4125, Propagation and Imaging through the Atmosphere IV, (Nov. 17, 2000).

R. F. Lutomirski and R. E. Warren, "Atmospheric Distortions in a Retroreflected Laser Signal," Appl. Opt., vol. 14, No. 4, 840-846 (1975).

Dan Sadot and Norman S. Kopeika, "Forecasting optical turbulence strength on the basis of macroscale meteorology and aerosols: models and validation," Optical Engineering 31(2), 200-212 (Feb. 1992).

A. Arockia Bazil Raj, J. Arputha Vijaya Selvi, and S. Durairaj, "Comparison of different models for ground level atmospheric turbulence strength (Cn2) prediction with a new model according to local weather data for FSO applications," Appl. Opt. vol. 54, No. 4, 802-815 (2015).

Sergey Bendersky, Norman S. Kopeika, and Natan Blaunstein, "Atmospheric optical turbulence over land in middle east coastal environments: prediction modeling and measurements," Appl. Opt. 43, 4070-4079 (2004).

Arnold Tunick, "Optical turbulence parameters characterized via optical measurements over a 2.33 km free-space laser path," Opt. Express, vol. 16, No. 19, 14645-14654 (2008).

Matthew R. Whiteley, Donald C. Washburn, and Lawrence A. Wright, "Differential tilt technique for saturation-resistant profiling of atmospheric turbulence," Proc. SPIE 4494, Adaptive Optics Systems and Technology II, (Feb. 4, 2002).

Larry C. Andrews and Ronald L. Phillip, "Laser Beam Propagation through Random Media," Second Edition, SPIE Press, Chapter 4, 2005.

Larry C. Andrews and Ronald L. Phillip, "Laser Beam Propagation through Random Media," Second Edition, SPIE Press, Chapter 6, 2005.

A. M. Brown, M. B. Airola, A.M. Brown, D. M. Brown, M. Keller, C. M. Martin, S. B. Strong, M. E. Thomas, and A.H. Willitsford, "Hydrosol characterization in maritime environments," Presentation at 35th Review of Atmospheric Transmission Models Meeting, Jun. 11, 2014.

C.A. Bennett, "Principles of Physical Optics," John Wiley & Sons, Inc., Hoboken, NJ, Chapter 6.4, 2008.

V. I. Tatarskii, "Wave Propagation in a Turbulent Medium," translated from Russian by R.A. Silverman, Dover Publications, Inc., New York, NY, 1961.

Albert D. Wheelon, "Electromagnetic Scintillation II. Weak Scattering," Cambridge University Press, Chapter 7, 2003.

Kevin R. Johnson and Randle Dewees, "Design of a differential image motion monitor for measurement of optical turbulence in support of dynamic range tests," Proc. SPIE 8161, Atmospheric Optics IV: Turbulence and Propagation, 81610E (Sep. 8, 2011).

\* cited by examiner

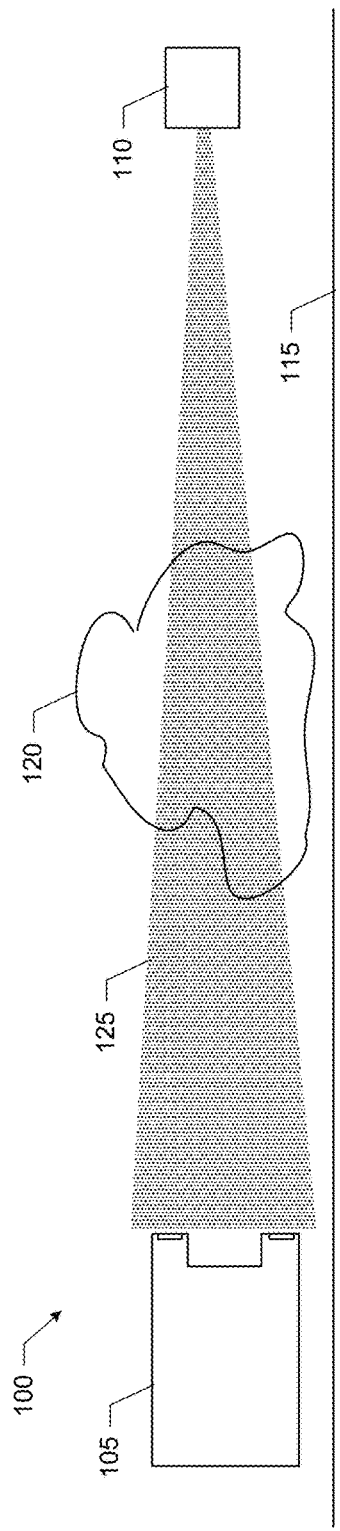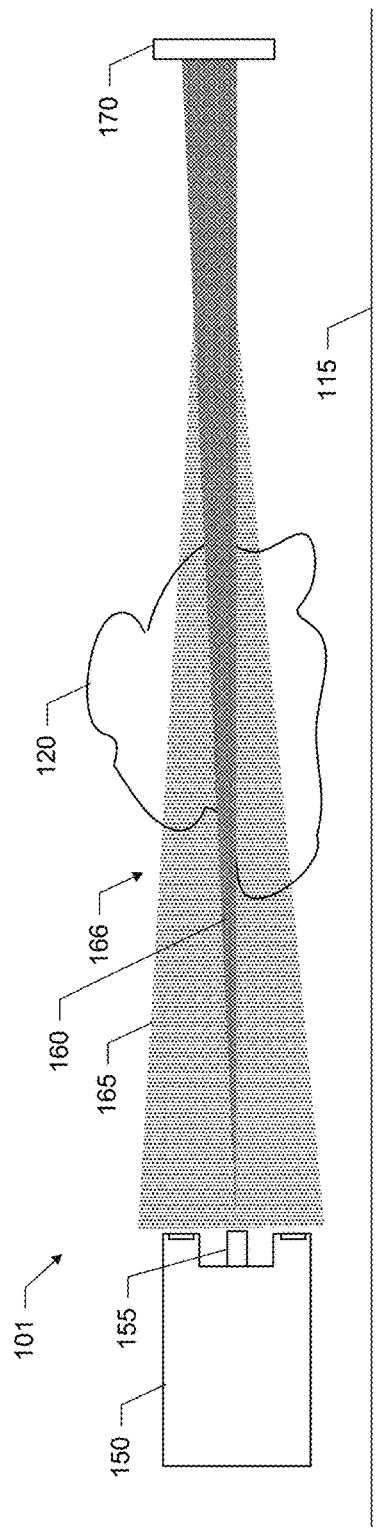

OPTICAL TURBULENCE MEASUREMENT

CROSS-REFERENCE TO RELATED APPLICATIONS

This application claims the benefit of U.S. Provisional Application No. 62/968,432 filed on Jan. 31, 2020, the entire contents of which are hereby incorporated herein by reference.

STATEMENT OF GOVERNMENTAL INTEREST

This invention was made with Government support under contract number HSBP10-14-C-00005 awarded by the Department of Homeland Security. The Government has certain rights in the invention.

TECHNICAL FIELD

Exemplary embodiments of the present disclosure generally relate to optical systems, and more specifically relate to system for measuring optical turbulence.

BACKGROUND

A variety of atmospheric parameters can impact the way light propagates through the atmosphere. These impacts, which may be referred to as atmospheric or optical turbulence, can have a negative impact on the quality of images captured by an optical system. These impacts can be present in both astronomical imaging, as well as, terrestrial imaging over a landscape, particularly at relatively long distances over terrain, vegetation, and structures that can create significant variations in the turbulence created by the Earth's thermal effects. The impact of turbulence on optical systems may cause blurring and distortion of images. Because the state of the atmosphere itself can be variable (e.g., due to wind currents) resulting in changes in the optical turbulence, the affected imagining capabilities of an optical system can also be variable. The effects can be of such a degree that, for example, differentiating between a faulty optical system and one impacted by the effects of optical turbulence can be difficult.

The temperature, water vapor, aerosol scatter, and turbulence along an optical path of interest are factors that contribute the optical turbulence, and, as such, some conventional techniques involve the measurement of these factors. However, such approaches are inherently inaccurate and cannot achieve accuracy for measurements along a specific optical path.

Another conventional solution for measuring optical turbulence is a scintillometer. Scintillometers operate based on measuring statistics of intensity (irradiance) fluctuations at a receiver. In this regard, the scintillometer system may employ multiple (e.g., two) modulated sources and collect light at a single receiver aperture. However, these, and other types of conventional optical systems used for turbulence measurements, may suffer from errors due to the use of a single source and receiver and the effect of vibration on the operation of the system.

As such, improvements in the area of turbulence measurement are needed. For example, being able to measure the optical turbulence over a specific path or line-of-sight of the optical system to determine the specific impact along the path, as opposed to general area measurements of based on factors such as temperature and humidity, would be beneficial.

BRIEF SUMMARY OF SOME EXAMPLES

According to some example embodiments, an optical turbulence measurement system is provided. The optical turbulence measurement system may comprise a support structure, a camera assembly, a first optics assembly, a second optics assembly, and processing circuitry. The camera assembly, the first optics assembly, and the second optics assembly may be coupled to the support structure. The first optics assembly may be configured to magnify and direct a first portion of a source beam received by a first aperture of the first optics assembly to the camera assembly to be received as a first received beam. The second optics assembly may be configured to magnify and direct a second portion of the source beam received by a second aperture of the second optics assembly to the camera assembly to be received as a second received beam. The processing circuitry, in communication with the camera assembly, may be configured to receive a data representation of the first received beam and the second received beam from the camera assembly. The processing circuitry may be further configured to determine, based on the data representation, a focal spot displacement variance based on motion of a first focal spot corresponding to the first received beam relative to a second focal spot corresponding to the second received beam. Additionally, the processing circuitry may be further configured to measure optical turbulence along a path of the source beam based on the focal spot displacement variance.

According to some example embodiments, a method for performing an optical turbulence measurement is provided. The method may comprise receiving a first portion of a source beam by a first aperture of a first optics assembly as a first received beam, and magnifying and directing the first received beam to a camera assembly for receipt by the camera assembly. The method may further comprise receiving a second portion of the source beam by a second aperture of a second optics assembly as a second received beam, and magnifying and directing the second received beam to the camera assembly for receipt by the camera assembly. The method may further comprise receiving, by processing circuitry, a data representation of the first received beam and the second received beam from the camera assembly, determining, by the processing circuitry, a focal spot displacement variance based on motion of a first focal spot corresponding to the first received beam relative to a second focal spot corresponding to the second received beam, and measuring optical turbulence along a path of the source beam based on the focal spot displacement variance.

According to some example embodiments, a system for optical turbulence measurement is provided. The system may comprise an optical turbulence measurement device and a retroreflector. The optical turbulence measurement device may comprise a support structure, a camera assembly, a first optics assembly, a second optics assembly, an optical source, and processing circuitry. The camera assembly, the first optics assembly, the second optics assembly, and the optical source may be coupled to the support structure. The first optics assembly may be configured to magnify and direct a first portion of a source beam received by a first aperture of the first optics assembly to the camera assembly to be received as a first received beam, and the second optics assembly may be configured to magnify and direct a second portion of the source beam received by a second aperture of the second optics assembly to the camera assembly to be received as a second received beam. The optical source may be configured to generate an output beam. The system may further comprise a retroreflector located a retroreflector distance away from the optical source. The retroreflector may be configured to reflect the output beam to be received by the first aperture and the second aperture as the source beam. The processing circuitry may be configured to receive a data representation of the first received beam and the second received beam from the camera assembly, determine, based on the data representation, a focal spot displacement variance based on motion of a first focal spot corresponding to the first received beam relative to a second focal spot corresponding to the second received beam, and measure optical turbulence along a path of the source beam based on the focal spot displacement variance and a path-weighting function that varies over the retroreflector distance.

BRIEF DESCRIPTION OF THE SEVERAL VIEWS OF THE DRAWING(S)

Having thus described the some example embodiments in general terms, reference will now be made to the accompanying drawings, which are not necessarily drawn to scale, and wherein:

FIG. 1A illustrates an example bistatic optical turbulence measurement system according to some example embodiments;

FIG. 1B illustrates an example monostatic optical turbulence measurement system according to some example embodiments;

DETAILED DESCRIPTION

Figure 2:
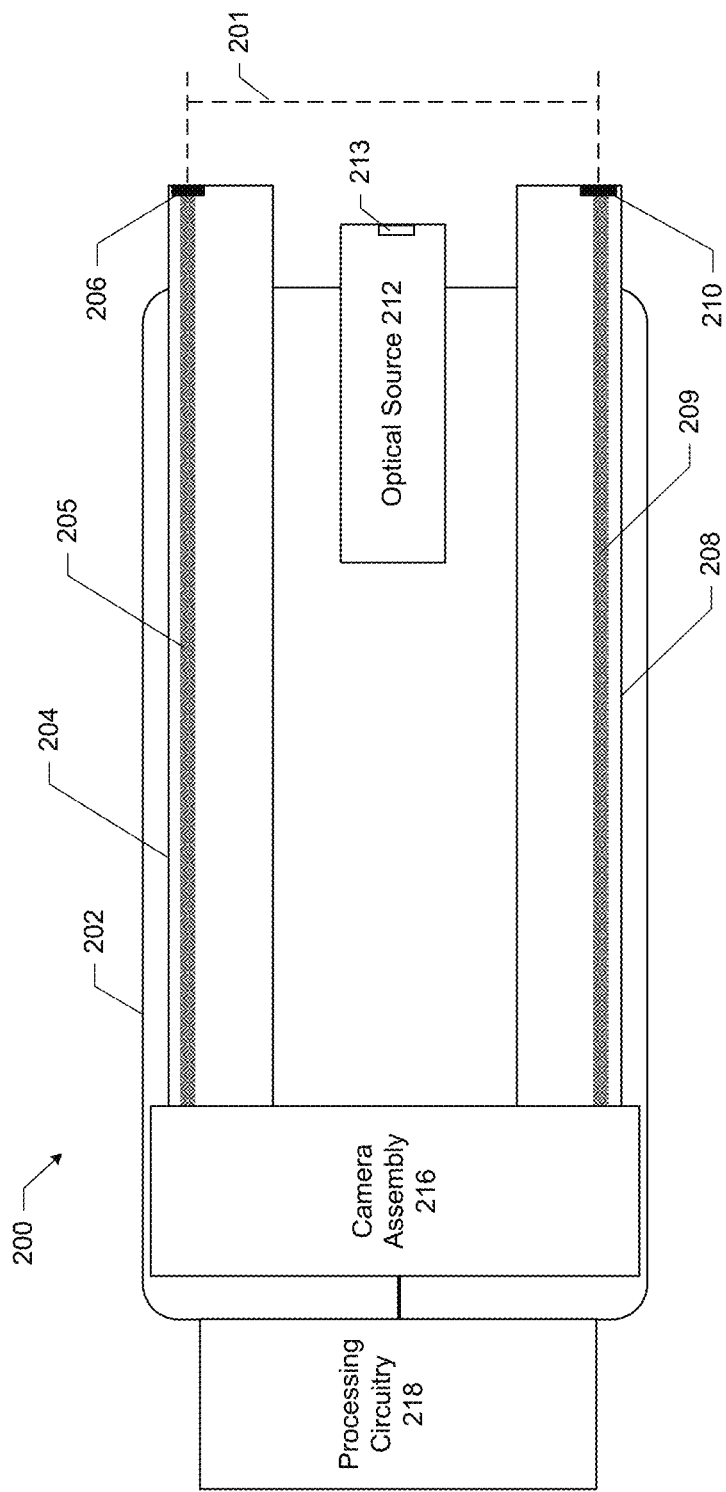
FIG. 2 illustrates an example optical turbulence measurement device according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In view of the foregoing, example embodiments associated with the measurement of optical turbulence are provided herein. An example system for measuring optical turbulence may comprise an optical turbulence measurement device configured to measure optical turbulence along a line-of-site of the device and an optical source configured to generate a source beam that is received by the optical turbulence measurement device and used to measure the optical turbulence. Such measurements, according to some example embodiments, may be taken in real-time or near-real time. The optical source may cause a light beam (e.g., a laser) to propagate across a path, also referred to as a turbulence field, to the optical turbulence measurement device. The optical turbulence measurement device may be configured to measure the optical turbulence of the turbulence field based on the effects on the light beam received by the optical turbulence measurement device. According to some example embodiments, the system may have a bistatic configuration where the optical source is positioned away from the optical turbulence measurement device and across the turbulence field and with a light beam aimed at the optical turbulence measurement device. Alternatively, according to some example embodiments, the system may have a monostatic configuration where the optical source is located with, or is a component of, the optical turbulence measurement device and the light source may aim a light beam away from the optical turbulence measurement device through the turbulence field at a reflective material (e.g., a retroreflector) to reflect the light beam back through the turbulence field to the optical turbulence measurement device for measurement.

The optical turbulence measurement device may be a dual aperture device and, as such, a portion of the light beam may be received into each of the apertures. The separate portions of the light beam may be received by a camera assembly of the optical turbulence measurement device and converted into data for analysis. Because of the dual aperture approach, a differential image motion monitor (DIMM) approach may be used for the analysis. In this regard, a measurement of the optical turbulence in the turbulence field may be determined by analyzing uncorrelated motion of two focal spots on images of the received light beam. The uncorrelated motion of the two focal spots results from inhomogeneities in the atmosphere within turbulence field and therefore can be used to measure the optical turbulence within the turbulence field. As such, according to some example embodiments, the optical turbulence measurement device may be configured to measure the optical turbulence as a refractive structure constant, $C_n^2$ (structure constant of refractive index), along the selected optical path using, for example, a laser-based differential image motion monitor technique. Further, the measurement of the turbulence field may involve the use of statistics on angle of arrival differences, where the angle of arrival is determined by an effective focal length of the optical system and locations of associated focal spots received on, for example, a focal plane of a camera assembly or imager.

According to some example embodiments, the optical turbulence measurement device may be implemented in an compact form factor, thereby permitting the device to implemented in a variety of applications. Because of the difficulties in differentiating a faulty camera system with one that is currently being affected by optical turbulence, an optical turbulence measurement device, according to some example embodiments, can be implemented, in situ, to evaluate deployed visible and infrared imaging systems. Such evaluations can be useful for supporting initial imaging system acceptance testing, as well periodic monitoring to determine if repair or replacement actions with respect to the imaging systems are needed. Alternatively, according to some example embodiments, the optical turbulence measurement device described herein may be useful in association with, for example, projectile targeting systems, directed energy weapons, as well as free space optical communications. With respect to directed energy weapons, such as, high energy lasers (HEL), the effectiveness can be substantially affected by the In this regard, for example, the effects of optical turbulence may impact the operation of optical weapons guidance systems and therefore an optical turbulence measurement device may be useful for either remotely measuring the turbulence near a target or by including the optical turbulence measurement device on the projectile to assist with imaging and turbulence measurements during flight.

As such, some example embodiments of the optical turbulence measurement devices and systems described herein can be used to evaluate dynamic paths from hundreds of meters to, for example, 20 kilometers. To achieve such ranges of distances, instrument architecture innovations have been created. For example, according to some example embodiments, a laser-based differential image motion monitor (DIMM) device is described herein that uses a cooperative, retroreflective target in a monostatic configuration. In this regard, since the optical source of the laser and the dual-aperture device for receiving the reflected laser are co-located and aligned to each other, the selection of a measurement path may be more readily performed by placing a retroreflector at the target location. The use of a retroreflector in association with the operation of a optical turbulence measurement device, according to some example embodiments, is different from conventional systems. As further described below, an example weighting function, associated with a DIMM approach and according to some example embodiments, has a curve that folds back, resulting in a weight that can provide a more representative measurement of a path average than is otherwise conventionally available. Additionally, the devices and systems described herein may be useful in bistatic configurations, where an optical source (e.g., a light source), rather than a retroreflector, is placed at the target location.

As further described herein, according to some example embodiments, an optical turbulence measurement device may operate as a type of angular magnifier (i.e., similar to a telescope) that is combined with a focusing lens (e.g., first magnification device 302 and second magnification device 310, described further below) in each optical path. As such, the effective focal length of the measurement device may be an angular magnification factor multiplied by a focal length of the focusing lens for each optical path. The focusing lens may, according to some example embodiments, operate to transform angles associated with the angular magnification into spatial coordinates on the focal plane array. As such, the optical paths (or arms) of a turbulence measurement device, according to some example embodiments, may operate as separate, compact, and modular optical sub-systems, thereby reducing complexity and cost.

Further, according to some example embodiments, the range of an optical turbulence measurement device may be adjustable. The angular magnification in an optical path may be changed by replacing the focusing lens or magnification devices or by employing magnification devices that include cascading magnification elements or lenses. In this manner, for example, a zoom feature may be introduced since the focal length of the optical path of the turbulence measurement device has changed, allowing for different ranges of measurement. As such, according to some example embodiments, an optical turbulence measurement device may be configured to range over many additional orders of magnitude during data collection.

FIGS. 1A and 1B illustrate two different system configurations for measuring optical turbulence. FIG. 1A illustrates a bistatic turbulence measurement system 100, according to some example embodiments. In this regard, the system 100 comprises a optical turbulence measurement device 105 disposed on one side of the turbulence field 120 and an optical source 110 disposed on an opposite side of the turbulence field 120.

As shown in FIG. 1A, the optical source 110 may be configured to output a source beam 125 as, for example, a laser beam. The source beam 125 may be generated such that the source beam 125 spreads or diverges to a diameter that is the same or larger than the distance between both apertures of the optical turbulence measurement device 105. The source beam 125 may propagate along a path from the optical source 110 to the optical turbulence measurement device 105 to be received by the apertures of the optical turbulence measurement device 105. Further, the optical source 110 may be positioned relative to the ground 115 and may be oriented to output a source beam 125 along a ground-based path through the turbulence field 120 aimed at the optical turbulence measurement device 105. Although the turbulence field 120 is indicated as being present in only a portion of the path of the source beam 125, the turbulence field 120 may extend the entire length between the optical source 110 and the optical turbulence measurement device 105.

The optical turbulence measurement device 105 may be positioned to receive the source beam 125 at both apertures of the optical turbulence measurement device 105. As mentioned above, the source beam 125 may have a beam width that allows for the source beam 125 to be received at both apertures. As opposed to being oriented towards an astronomical source, the optical turbulence measurement device 105 may orient the apertures along a ground-based optical path (e.g., with end points within the Earth's atmosphere). Accordingly, the source beam 125 may be received by the optical turbulence measurement device 105 and the impact of the turbulence field 120 on the source beam 125 may be measured to determine the optical turbulence in the turbulence field 120 through the line-of-sight of the optical turbulence measurement device 105.

Alternatively, FIG. 1B illustrates a monostatic turbulence measurement system 101, according to some example embodiments. In this regard, the system 101 comprises a optical turbulence measurement device 150 disposed on one side of the turbulence field 120. However, rather than the optical source 110 being disposed on the opposite side of the turbulence field 120 as shown in FIG. 1A, a retroreflector 170 may be placed on the opposite side of the turbulence field 120. The distance from the optical turbulence measurement device 150 to the retroreflector 170 may be referred to as the retroreflector distance. Further, the optical turbulence measurement device 150 may comprise an optical source 155 that is a component of the optical turbulence measurement device 150 and is co-located with the apertures of the optical turbulence measurement device 150. Accordingly, the optical source 155 may provide an output beam 160 from the optical turbulence measurement device 150 that is reflected off of the retroreflector 170 to generate a return beam as the source beam 165 to be received by the apertures of the optical turbulence measurement device 150. As such, the output beam 160 may propagate along a path from the optical source 155 to the retroreflector 170, and the source beam 165 may propagate along a path from the retroreflector 170 to the optical turbulence measurement device 150 to be received by the apertures of the optical turbulence measurement device 150. In this regard, the retroreflector 170 may be a device that reflects radiation with minimal scattering, for example, by comprising adjacent non-planar reflective surfaces, such as with a cornercube or cat's eye configuration. The output beam 160 and the source beam 165 may be collectively referred to as a folded beam 166. Due to the interaction of the output beam 160 with the retroreflector 170, the resultant source beam 165 may spread or diverge to a diameter that covers both apertures of the optical turbulence measurement device 105 for receipt of the source beam 165. Further, the optical source 155 and the retroreflector 170 may be positioned relative to the ground 115 such that the output beam 160 and the source beam 165 propagate along a ground-based path through the turbulence field 120 aimed at the optical turbulence measurement device 105. In contrast to the bistatic turbulence measurement system 100, the path of the folded beam 166 involves propagation through the turbulence field 120 twice. However, according to some example embodiments, the effect of the turbulence measurements may not be affected by the nature of the folded beam 166. The refractive inhomogeneities along the path may be considered static, and therefore the folded beam 166 may be experiencing identical, yet inverted, turbulent paths. This difference can be accounted for when processing where the effects may, according to some example embodiments, drop out of the turbulence determination associated with receipt of the source beam 165 as further described below. Again, although the turbulence field 120 is indicated as being present in only a portion of the path of the output beam 160 and the source beam 165, the turbulence field 120 may extend the entire length between the optical source 110 and the optical turbulence measurement device 150.

The optical turbulence measurement device 150 may be positioned to receive the source beam 165 at both apertures of the optical turbulence measurement device 150. As mentioned above, the source beam 165 may have a beam width that allows for the source beam 165 to be received at both apertures. As opposed to being oriented towards an astronomical source, the optical turbulence measurement device 150 may, again, orient the apertures along a ground-based optical path (e.g., with end points within the Earth's atmosphere). Accordingly, the source beam 165 may be received by the optical turbulence measurement device 150 and the impact of the turbulence field 120 on the source beam 165 may be measured to determine optical turbulence in the turbulence field 120 through the line-of-sight of the optical turbulence measurement device 150.

Operating a turbulence measurement system in the monostatic configuration may have a number of benefits over the bistatic system approach. The first, and most practical, is the inherent ease of system construction and setup to align the source beam 165, reflected from the retroreflector, with the apertures of the optical turbulence measurement device 150. Additionally, the retroreflector 170 can be movable, during a measurement process, and the optical turbulence measurement device 150 may also be movable via a tracking capability with the retroreflector 170 to make optical turbulence measurements along successive lines-of sight of the optical turbulence measurement device 150 as the retroreflector 170 moves.

Having described some of the general system configurations for implementing turbulence measurements according to some example embodiments, FIG. 2 will now be described, which shows a functional block diagram of an example embodiment of an optical turbulence measurement device 200. In this regard, the optical turbulence measurement device 200 may comprise a first optics assembly 204, a second optics assembly 208, a camera assembly 216, and processing circuitry 218. Additionally, according to some example embodiments, the optical turbulence measurement device 200 may also include an optical source 212.

The first optics assembly 204, the second optics assembly 208, the camera assembly 216, and the optical source 212 may be coupled (e.g. affixed) to or otherwise supported by a support structure 202. The support structure 202 may be, for example, a rigid frame formed of metal (e.g., aluminum) and configured to support, for example, the fixed positioning of the first optics assembly 204 relative to the second optics assembly 208. Additionally, the camera assembly 216, and the optical source 212 may be affixed to the support structure 202 and may be in fixed positions relative to the first optics assembly 204 and the second optics assembly 208. According to some example embodiments, the first optics assembly 204, the second optics assembly 208, and the camera assembly 216 may therefore be co-located at the optical turbulence measurement device 200 as a result of being affixed to the support structure 202. Further, according to some example embodiments, the optical source 212 may also be co-located at the optical turbulence measurement device 200 as a result of being affixed to the support structure 202. The processing circuitry 218 may also be supported by the support structure 202. However, in some example embodiments, the processing circuitry 218 may be supported elsewhere but still electrically coupled to, for example, the camera assembly 216 and the optical source 212 to interface with the camera assembly 216 and the optical source 212 for control and receipt of data.

According to some example embodiments, the first optics assembly 204 may comprise a first aperture 206. As mentioned above, a first portion of the source beam (e.g., source beam 125 or 165) may be received by and through the first aperture 206 as a first received beam 205. The first optics assembly 204 may be configured to magnify and direct the first received beam 205 to the camera assembly 216. Moreover, according to some example embodiments, the first optics assembly 204 may comprise components configured to receive the first received beam 205, magnify the first received beam 205, and direct the first received beam 205 to the camera assembly 216. In this regard, according to some example embodiments, the first optics assembly 204 may comprise, for example, lenses, beam splitters, and mirrors to receive the first received beam 205, magnify the first received beam 205 and direct the first received beam 205 to the camera assembly 216. However, according to some example embodiments, the first optics assembly 204 may, for example, perform magnification via other approaches, such as via a holographic element. Similarly, the second optics assembly 208 may comprise a second aperture 210. As mentioned above, a second portion of the source beam (e.g., source beam 125 or 165) may be received by and through the second aperture 210 as the second received beam 209. The second optics assembly 208 may be configured to magnify and direct the second received beam 209 to the camera assembly 216. Moreover, according to some example embodiments, the second optics assembly 208 may comprise components configured to receive the second received beam 209, magnify the second received beam 209, and direct the second received beam 209 to the camera assembly 216. In this regard, according to some example embodiments, the second optics assembly 208 may comprise, for example, lenses, beam splitters, and mirrors to receive the second received beam 209, magnify the second received beam 209, and direct the second received beam 209 to the camera assembly 216. However, according to some example embodiments, the second optics assembly 208 may, for example, perform magnification via other approaches, such as via a holographic element. According to some example embodiments, the components of the first optics assembly 204, the second optics assembly 208, and the camera assembly 216 (e.g., lenses, mirrors, beam splitters, holographic elements, and other optic components) may comprise custom designed and machined segmented primary mirror systems, which may be employed to circumvent the detrimental impact of high frequency vibration of the optical turbulence measurement device 200.

According to some example embodiments, the first aperture 206 may be spaced apart from the second aperture 210 by a defined distance 201. The distance 201 may be defined from a center of the first aperture 206 to a center of the second aperture 210. As further described below, the distance 201 between the first aperture 206 and the second aperture 210 may allow each of the apertures 206 and 210 to have a slightly different perspective of the source beam that has traveled through the turbulence field. This difference in perspective can be used to measure the turbulence due to differences in the source beam as received by the first aperture 206 relative to the source beam as received by the second aperture 210. According to some example embodiments, the first aperture 206 and the second aperture 210 may be positioned such that the first aperture 206 and the second aperture 210 are vertically aligned with respect to the ground. In other words, the first aperture 206 and the first optics assembly 204 may be stacked above the second aperture 210 and the second optics assembly 208. However, according to some example embodiments, the first aperture 206 and the second aperture 210 may be positioned in other configurations such that the first aperture 206 and the second aperture 210 are horizontally or even diagonally aligned with respect to the ground. In these configurations, the first optics assembly 204 with the first aperture 206 and the second optics assembly 208 with the second aperture 210 may operate as twin optical telescope assemblies that are mounted in fixed positions to the support structure 202 with the apertures 206 and 210 being offset from each other by the defined distance 201. Further, in some example embodiments, increased distances 201 (i.e., wide separations between the apertures 206 and 210) may be used that support the measurement of relatively low turbulence conditions.

According to some example embodiments, the distance 201 between the apertures 206 and 210 may be selectable. In this regard, the components of the optical turbulence measurement device 200 may be readily reconfigurable to support a functionality to permit the distance 201 between the apertures 206 and 210 to be changed. The distance 201 between apertures 206 and 210 may be changed by moving, for example, the first optics assembly 204 and the second optics assembly 208 to change the distance 201. As such, according to some example embodiments, the distance 201 may be changed manually or via a motor coupled to the first optics assembly 204 and the second optics assembly 208. The distance 201 between the apertures 206 and 210 may be increased or decreased as a function of the desired turbulence level or desired range over which to make which to make a turbulence measurement. For example, a smaller distance 201 (e.g., about thirty centimeters) between apertures 206 and 210 may facilitate measurement of turbulence at a range of, for example, about 500 meters. A larger distance 201 (e.g., about 50 centimeters or more) between apertures 206 and 210 may facilitate measurement of turbulence at a range of, for example, about 1 kilometer to 3 kilometers. Alternatively, although example embodiments are shown as a dual-aperture system, according to some example embodiments, the optical turbulence measurement device 200 may comprise more than two apertures and associated optics assemblies to support additional focal spots. As such, the focal spots associated with the additional apertures may be used to perform a turbulence measurement based on more than two focal spot images.

Unlike many conventional systems that utilize a dual-aperture, single optical path (e.g., a dual-aperture, single optical path telescope), example embodiments of the optical turbulence measurement devices described herein employ two or more optical paths. The first optics assembly 204 defines a first optical path and the second optics assembly 208 defines a second optical path. The first optical path and the second optical path may be isolated, compact, and independent from each other—other than to possibly terminate, for example, into an optical wedge for imaging. Because of the independent optical paths, according to some example embodiments, an optical turbulence measurement device 200 may be provided that includes multiple apertures (e.g., more than two) and multiple cameras to support multiple variations or measurements associated with range, scale, orientation, and the like.

The camera assembly 216 may comprise one or more imagers (e.g., high speed digital cameras, focal plane arrays, or the like) and optical components. The camera assembly 216 may be configured to receive the magnified and directed received beams 205 and 209 from the first optics assembly 204 and the second optics assembly 208, respectively, at one or more imagers and convert these received beams 205 and 209 into image data or data representations of the first received beam 205 and the second received beam 209 for provision to the processing circuitry 218. The processing circuitry 218 may be configured to process the data representations provided by the camera assembly 216 to determine a turbulence measurement or a strength of the turbulence according to various example embodiments, as further described below.

According to some example embodiments, as described above, the optical source 212 may be co-located at the optical turbulence measurement device 200 for monostatic operation. The optical source 212 may be a high-power, narrow beam light source, such as a laser source. For example, the optical source 212 may be 30 mW diode laser with a wavelength of 830 nm coupled to a telescope beam expander at a full angle divergence set at 3 mrad. According to some example embodiments, the optical source 212 may be a collimated laser source, for example, with a beam waist (width) of 50 cm. According to some example embodiments, the optical source 212 may be affixed to the same support structure 202 as the first optics assembly 204 and the second optics assembly 208. In this regard, according to some example embodiments, the optical source 212 may be positioned between the first aperture 206 and the second aperture 210. Further, the optical source 212 may be positioned between the first aperture 206 and the second aperture 210 such that the beam output port 213 of the optical source 212 is linearly aligned with the first aperture 206 and the second aperture 210 when viewed from the front, receiving end of the optical turbulence measurement device 200. In other words, the first aperture 206, second aperture 210, and the beam output port 213 may be co-planar, and the plane defined by the first aperture 206, second aperture 210, and beam output port 213 may be perpendicular to a plane of the ground surface. As such, the beam output port 213 of the optical source 212 may be aligned with the line-of-sight defined by the first aperture 206 and the second aperture 210. By aligning the optical source 212, with the first aperture 206, and the second aperture 210 in this manner, alignment of the source beam with first aperture 206 and the second aperture 210, based the reflection of the output beam of the optical source 212, may be accomplish more readily.

Figure 3A:
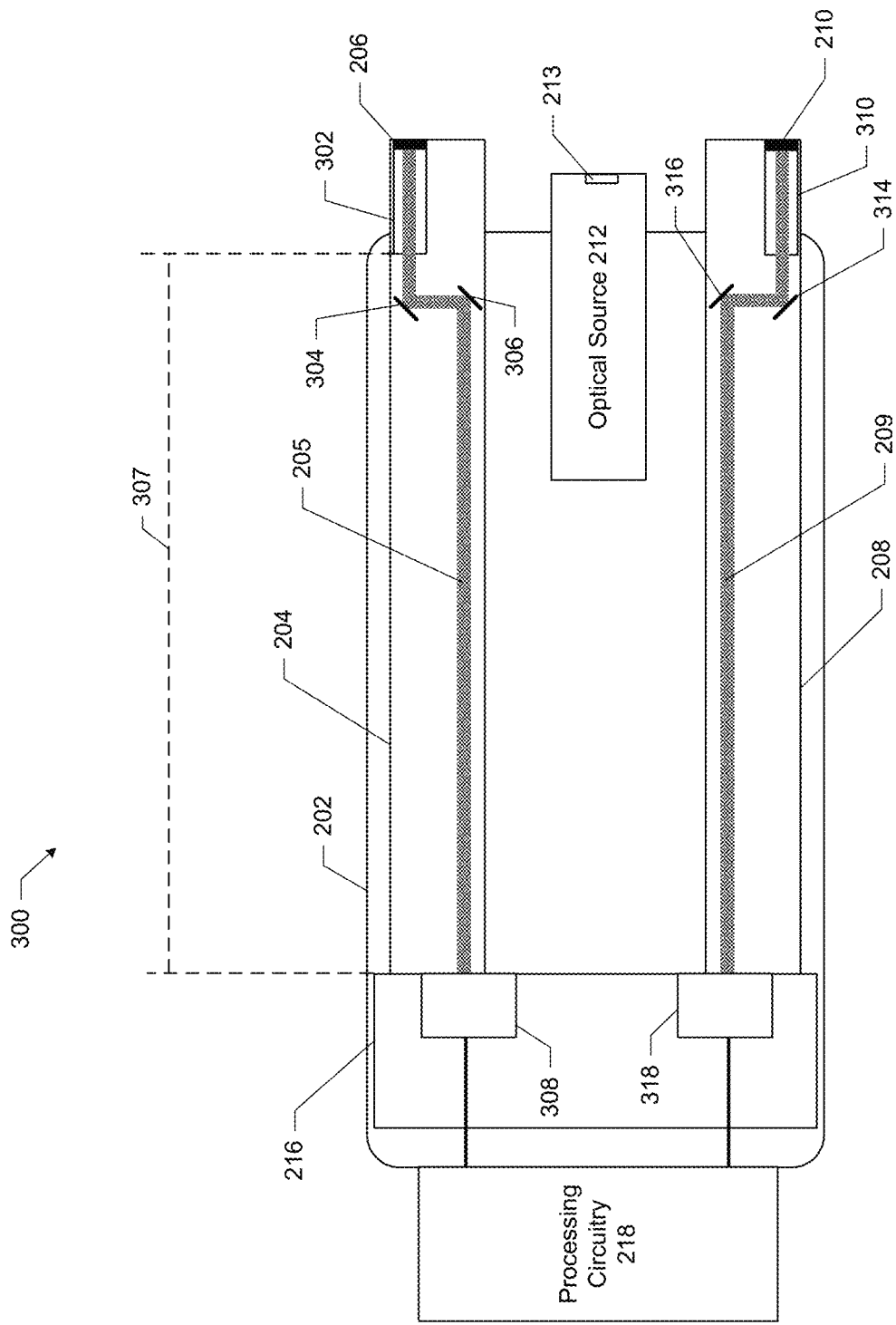
FIG. 3A illustrates an example optical turbulence measurement device with dual-imagers according to some example embodiments.

Having described a more general example embodiment of an optical turbulence measurement device, FIGS. 3A to 3C will now be described with respect to the structure of some more specific example embodiments. In this regard, FIG. 3A illustrates an example embodiment of an optical turbulence measurement device 300 that is an example dual-aperture, dual-imager embodiment.

The optical turbulence measurement device 300 may comprise the first optics assembly 204, second optics assembly 208, a camera assembly 216, and processing circuitry 218. Additionally, according to some example embodiments, the optical turbulence measurement device 300 may also include the optical source 212. However, the optical turbulence measurement device 300, as shown in FIG. 3A, includes further details of the components and configuration of the first optics assembly 204, second optics assembly 208, and camera assembly 216, according to some example embodiments. In this regard, according to some example embodiments, the camera assembly 216 may comprise a first imager 308 associated with the first optics assembly 204 and a second imager 318 associated with the second optics assembly 208.

In this regard, the first optics assembly 204 may comprise a first magnification device 302, a first mirror 304, and a second mirror 306. The first magnification device 302 may include one or more optical lenses configured to magnify a scene within the light received by the first magnification device 302. According to some example embodiments, the first magnification device 302 may be a telescopic optical device. Further, according to some example embodiments, the optical input of the first magnification device 302 may form or be aligned with the first aperture 206. Therefore, the first portion of the source beam received by the first optics assembly 204 may be received into the first magnification device 302 as the first received beam 205, and the first received beam 205 may be magnified by the first magnification device 302. After magnification, the first received beam 205 may, according to some example embodiments, be directed or aligned with the first imager 308 of the camera assembly 216 via a series of mirrors 304 and 306. According to some example embodiments, the mirror 304 may also be a beam splitter, e.g., a 50/50 beam splitter. According to some example embodiments, however, the output of the first magnification device 302 may be aligned with the first imager 308 and received directly (i.e., without intervening mirrors or beam splitting devices). According to some example embodiments, a distance 307 between an output of the first magnification device 302 and the first imager 308 may be a function of the focal length of the first magnification device 302. As such, according to some example embodiments, the first imager 308 may be disposed within the optical turbulence measurement device 300 at a distance 307 from the first magnification device 302 that is the focal length of the of the first magnification device 302 to permit the first imager 308 to capture images of the first received beam 205 that are in focus and provide a first data representation of the first received beam 205 to the processing circuitry 218.

The second optics assembly 208 may have the same components and a similar configuration as the first optics assembly 204 with the optical turbulence measurement device 300. In this regard, the second optics assembly 208 may comprise a second magnification device 310, a third mirror 314, and a fourth mirror 316. The third mirror 314 may be a beam splitter, e.g., a 50/50 beam splitter. According to some example embodiments, the second magnification device 310 may be the same or similar to the first magnification device 302, the third mirror 314 may be same or similar to the first mirror 304, and the fourth mirror 316 may be the same or similar to the second mirror 306. In this regard, the second magnification device 310 may include one or more optical lenses configured to magnify a scene within the light received by the second magnification device 310. According to some example embodiments, the second magnification device 310 may be a telescopic optical device. Further, according to some example embodiments, the optical input of the second magnification device 310 may form or be aligned with the second aperture 210. Therefore, the second portion of the source beam received by the second optics assembly 208 may be received into the second magnification device 310 as the second received beam 209, and the second received beam 209 may be magnified by the second magnification device 310. After magnification, the second received beam 209 may, according to some example embodiments, be directed or aligned with the second imager 318 of the camera assembly 216 via a series of mirrors 314 and 316. According to some example embodiments, however, the output of the second magnification device 310 may be aligned with the second imager 318 and received directly (i.e., without intervening mirrors or beam splitters). According to some example embodiments, a distance 307 between an output of the second magnification device 310 and the second imager 318 may be a function of the focal length of the second magnification device 310. As such, according to some example embodiments, the second imager 318 may be disposed within the optical turbulence measurement device 300 at a distance 307 from the second magnification device 310 that is the focal length of the of the second magnification device 310 to permit the first imager 308 to capture images of the first received beam 205 that are in focus and provide a second data representation of the second received beam 209 to the processing circuitry 218.

As such, the camera assembly 216 may be configured to receive the first received beam 205 and the second received beam 209 into respective imagers 308 and 318. According to some example embodiments, in the optical turbulence measurement device 300, the first received beam 205 and the second received beam 209 are not optically mixed. Rather, the processing circuitry 218 that receives data representations from the first imager 308 and the second imager 318 may be configured to perform a relative analysis of the image data, as further described below, for example, to determine uncorrelated movement of the focus points in the data representation from the first imager 308 relative to the data representation from the second imager 318 to measure the turbulence in the turbulence field being analyzed.

Figure 5B:
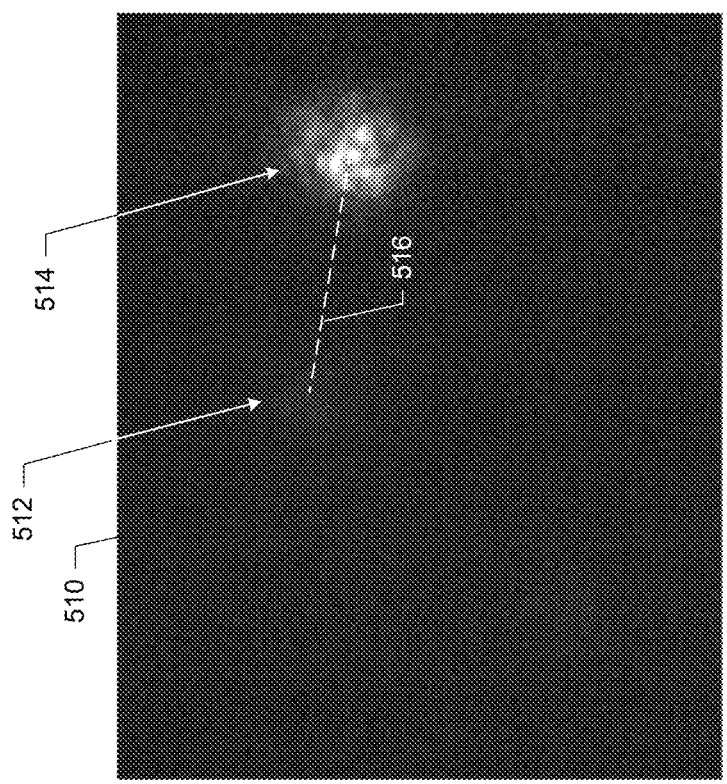
FIG. 5B illustrates another rendering of a focal spot image according to some example embodiments.

Such a multi-imager embodiment is possible due to the use of separate optical paths via the first optics assembly 204 and the second optics assembly 208. To employ the separate imagers 308 and 309, the processing circuitry 218 may be configured to time synchronize (e.g., electronically synchronize) the imagers 308 and 309. According to some example embodiments, any difference in the timing, such as due to jitter, may not be significant with respect to the time scale of the image capture rate. Further, such embodiments may benefit from the use of smaller focal planes for the imagers 308 and 309, relative to a solution that employs a single imager. The smaller focal planes can be used, according to some example embodiments, because the focal plane of the imager only needs to be large enough to accommodate the position variation and spot size increase (due to turbulence beam breakup) associated with a single aperture (as opposed to the position variation and spot size for two, or more, apertures). The use of smaller focal plane imagers, in the context of a multi-optical path, multi-imager system, may still support high turbulence measurements exhibiting increased focal spot position variation. Further, such smaller focal plane imagers may, according to some example embodiments, also be less expensive and have lower pixel counts, thereby supporting operation at higher speeds or frame rates. Additionally, the use of multiple imagers can also, according to some example embodiments, simplify data processing by providing images of a single spot to image processing algorithms described herein (e.g., DIMM algorithms), relative to the more complex approaches that are utilized in image captures that comprise two, or more, focal spots associated with the respective optical paths. Further, in some instances with single imager solutions, in addition to the spot excursions or variations, the multiple focal spots can expand and break up (as shown in FIG. 5B, described further below), which may result in a complex image. Such a complex image may require a segmented image analysis approach as part of the processing, which can be avoided in a multi-imager solution. As such, in example embodiments where each optical path employs a respective imager and a 'one spot per image' approach, the determination of the spot location and a centroid of the spot location may be simple, relative to a multi-spot imaging with a single imager. Additionally, a multi-imager solution may also allow for a larger field of view for the optical turbulence measurement device, which may result in a simplified alignment process that is less time consuming. Additionally, according to some example embodiments, a larger focal plane may be used in a multi-imager solution that can further assist with alignment and, once aligned, a smaller Region of Interest (ROI) can be specified on the larger focal plane that may be read to achieve image capture rates needed to support an optical turbulence measurement.

Figure 3B:
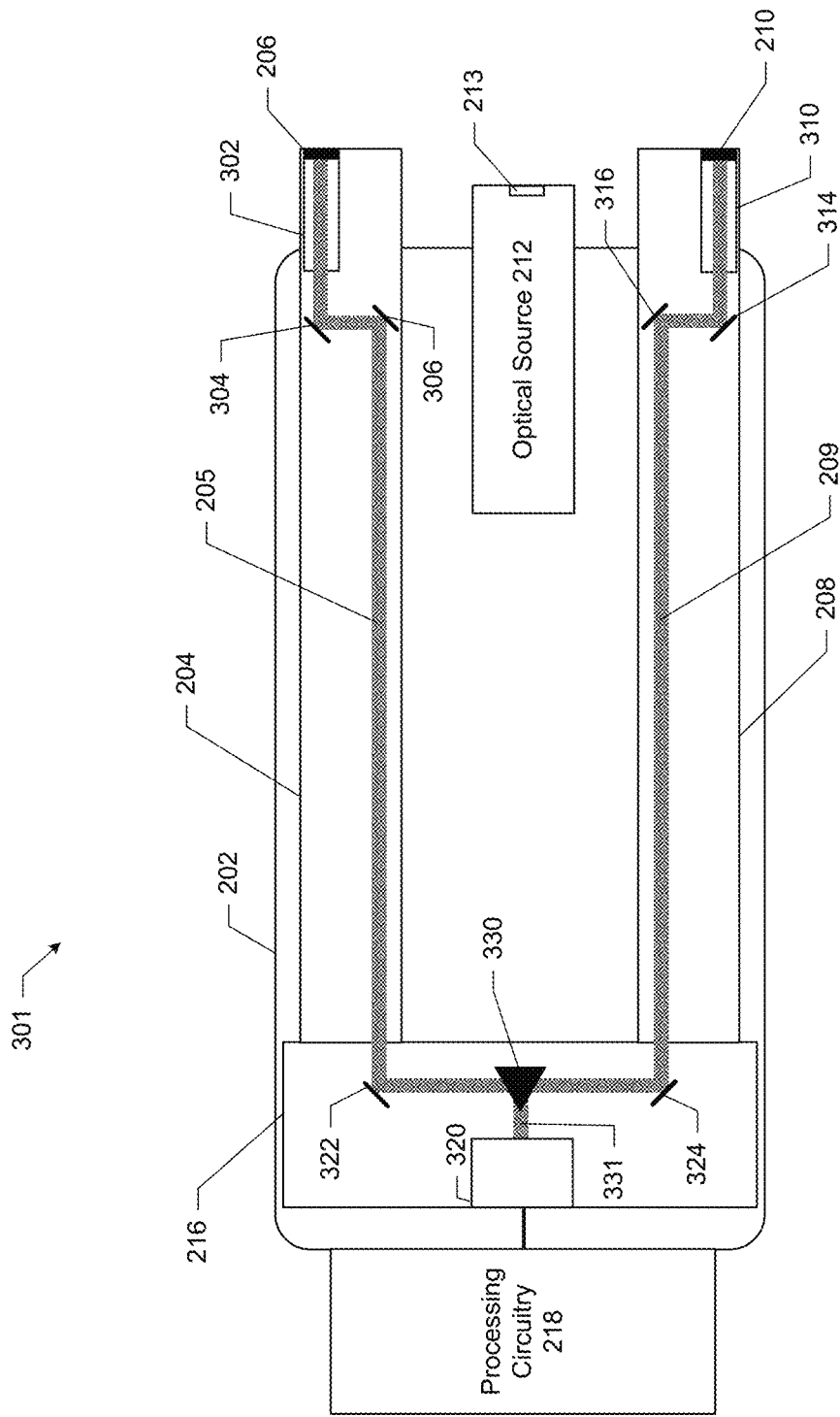
FIG. 3B illustrates an example optical turbulence measurement device with a single imager according to some example embodiments.

FIG. 3B illustrates another example embodiment of the optical turbulence measurement device as a dual-aperture, single imager configuration. In this regard, the optical turbulence measurement device 301 includes a different structure and configuration of the camera assembly 216 and the processing circuitry 218 form the optical turbulence measurement device 300. Moreover, other than the differences in the camera assembly 216 and the processing circuitry 218, and any other differences indicated below, the components and configuration of the components of the optical turbulence measurement device 301 are otherwise the same as those of the optical turbulence measurement device 300.

As such, according to some example embodiments, for the optical turbulence measurement device 301, the first received beam 205, after being magnified and directed by the first optics assembly 204, may be received by the camera assembly 216. Within the camera assembly 216, the first received beam 205 may be directed by a mirror 322 to an optical wedge 330. Mirror 322 may also be a beam splitter, e.g., a 50/50 beam splitter. Similarly, the second received beam 209, after being magnified and directed by the second optics assembly 208, may be received by the camera assembly 216. Within the camera assembly 216, the second received beam 209 may be directed by a mirror 324 to the optical wedge 330. Mirror 324 may also be a beam splitter, e.g., a 50/50 beam splitter. The optical wedge 330 may be an optical device configured to receive two input beams and generate a composite output beam that is an optical mixture of the two input beams. In this regard, the optical wedge 330 may be configured to receive the first received beam 205 from the mirror 322, receive the second received beam 209 from the mirror 324 and output a composite beam 331, which is an optical mixture of the first received beam 205 and the second received beam 209. The composite beam 331 may, in turn, be received by the imager 320. In this manner, the source beam received at each of the first aperture 206 and the second aperture 210 may ultimately be focused down onto a common plane of the imager 320. Because the path of the first received beam 205 and the second received beam 209 within the optical turbulence measurement device 301 may be different from those of optical turbulence measurement device 300, the configuration of the components may be altered account for the focal lengths of the first magnification device 302 and the second magnification device 310 such that a focused image is incident upon the imager 320. Additionally, the imager 320 may be configured to generate composite image data in the form of data representation of the composite beam 331 for provision to the processing circuitry 218. The processing circuitry 218 may be configured to perform a relative analysis of the composite image data, as further described below, for example, to determine uncorrelated movement of the focus points associated with the first received beam 205 and the second received beam 209 to measure the turbulence in the turbulence field being analyzed.

Figure 3C:
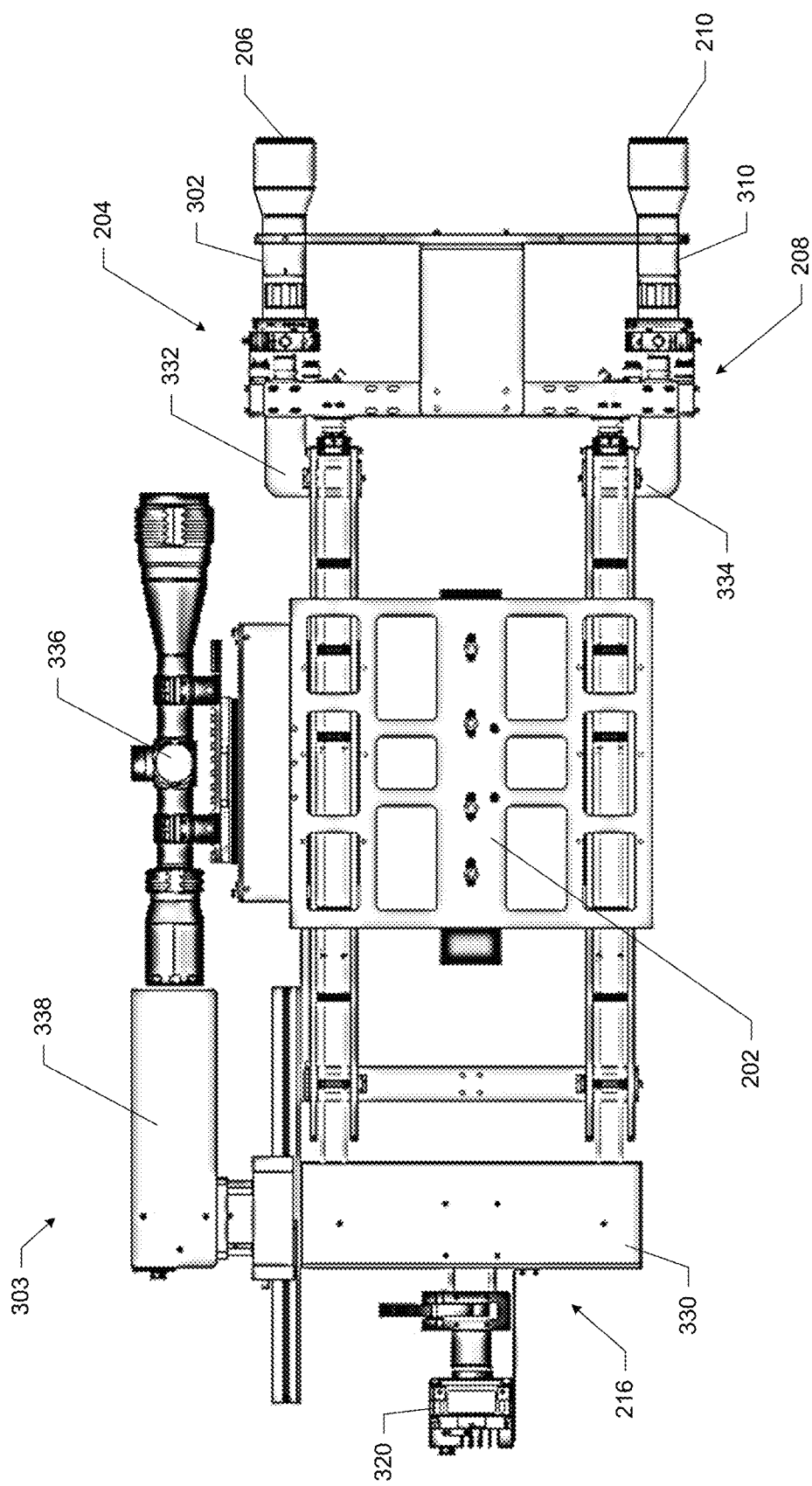
FIG. 3C illustrates another example optical turbulence measurement device with a single imager according to some example embodiments.

Now referring to FIG. 3C, another example embodiment of an optical turbulence measurement device 303 is shown. FIG. 3C provides a side view of the optical turbulence measurement device 303, and therefore the description of the operation of the components of the optical turbulence measurement device 303 will refer to some internal components and features that are not shown but have been described with respect to FIGS. 2, 3A, and 3B. The optical turbulence measurement device 303 is a more specific implementation of the optical turbulence measurement device 301 described above. As such, the optical turbulence measurement device 303 may be a dual-aperture, single imager embodiment. In the example embodiment of optical turbulence measurement device 303, the processing circuitry 218 is disposed remote from the support structure 202 and the optical turbulence measurement device 303 does not include an optical source 212 (and may be therefore configured for operation in a bistatic system with a remote optical source).

As shown in FIG. 3C, the first optics assembly 204 comprises the first magnification device 302, which defines the first aperture 206, and magnifies the first portion of the source beam received by the first aperture 206, also referred to as the first received beam 205. Similarly, the second optics assembly 208 comprises the second magnification device 310, which defines the second aperture 210, and magnifies the second portion of the source beam received by the second aperture 210, also referred to as the second received beam 209. Redirection of the first received beam 205 may occur within the housing portion 332, which may house, for example, the mirrors 304 and 306. Redirection of the second received beam 209 may occur within the housing portion 334, which may house, for example, the mirrors 314 and 316. Additionally, the first received beam 205 and the second received beam 209 may travel a distance within the optical turbulence measurement device 303 and be received by the camera assembly 216. The camera assembly housing 330 may house the mirrors 322 and 324, as well as, the optical wedge 330. The optical wedge 330 may receive the first received beam 205 and the second received beam 209 and generate the composite beam 331 for receipt by the imager 320. The imager 320 may provide image data based on image captures of the composite beam 331 to the processing circuitry 218 (not shown in FIG. 3C).

The optical turbulence measurement device 303 may include additional components. In this regard, the optical turbulence measurement device 303 may include a scope 336 and a camera 338. The scope 336 and the camera 338 may be useful in aiming the optical turbulence measurement device 303, for example, at a laser from a remote optical source. In this regard, the scope 336 may be a magnification device, but the magnification may be less than that of the first magnification device 302 or the second magnification device 310 to allow for course alignment with, for example, a laser from a remote optical source. The camera 338 may receive the magnified image from the scope 336 and convert the image into data that may be provided, for example, to position control circuitry (which may be a component of the processing circuitry 218). As such, if the optical turbulence measurement device 303 is mounted on a motor controlled stand, an operator may control the positioning of the optical turbulence measurement device 303 by viewing the images provided by the camera 338 as part of an alignment procedure.

Figure 4:
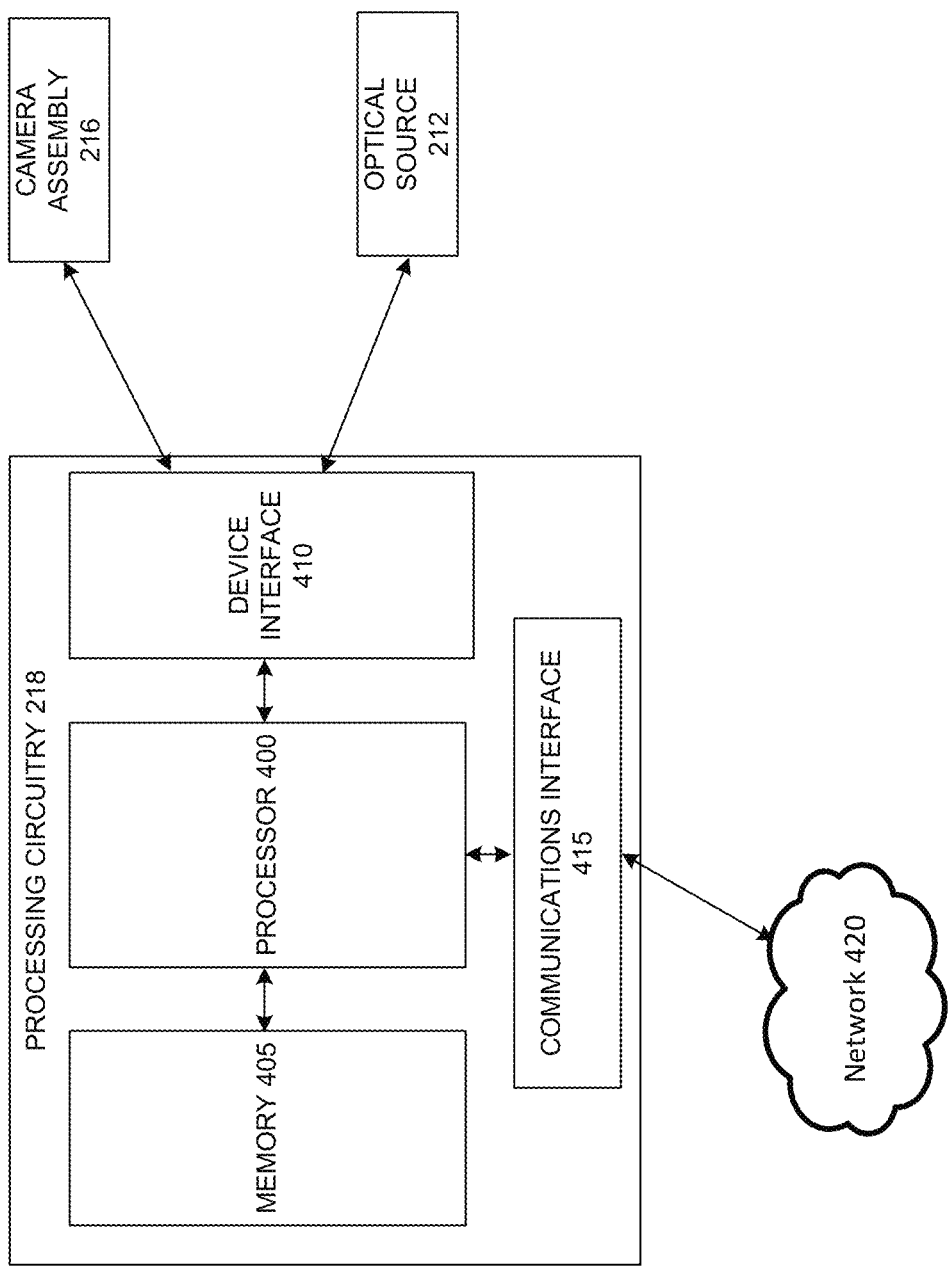
FIG. 4 illustrates example processing circuitry for an optical turbulence measurement device according to some example embodiments.

Now referring to FIG. 4, a block diagram of the processing circuitry 218 with various data and control interfaces is shown. Processing circuitry 218 may comprise a processor 400, a memory 405, a device interface 410, and a communications interface 415. Interfaces between the device interface 410 and the camera assembly 216 and between the device interface 410 and the optical source 212 are shown.

According to some example embodiments, processing circuitry 218 may be in operative communication with or embody, the memory 405, the processor 400, the device interface 410, and the communications interface 415. Through configuration and operation of the memory 405, the processor 400, the device interface 410, the communications interface 415, the processing circuitry 218 may be configurable to perform various operations as described herein, including the operations and functionalities described with respect to determining a turbulence measurement. In this regard, the processing circuitry 218 may be configured to perform computational processing, memory management, device interface control and monitoring, and manage remote communications, according to an example embodiment. In some embodiments, the processing circuitry 218 may be embodied as a chip or chip set. In other words, the processing circuitry 218 may comprise one or more physical packages (e.g., chips) including materials, components or wires on a structural assembly (e.g., a baseboard). The processing circuitry 218 may be configured to receive inputs (e.g., via peripheral components), perform actions based on the inputs, and generate outputs (e.g., for provision to peripheral components). In an example embodiment, the processing circuitry 218 may include one or more instances of a processor 400, associated circuitry, and memory 405. As such, the processing circuitry 218 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 405 may include one or more non-transitory memory devices such as, for example, volatile or non-volatile memory that may be either fixed or removable. The memory 405 may be configured to store information, data, applications, instructions or the like for enabling, for example, the functionalities described with respect to receiving data representations and generating a turbulence measurement. The memory 405 may operate to buffer instructions and data during operation of the processing circuitry 218 to support higher-level functionalities, and may also be configured to store instructions for execution by the processing circuitry 218. The memory 405 may also store various information including image data, orientation and position data, time data, turbulence measurements, and the like. According to some example embodiments, various data stored in the memory 405 may be generated based on other data and stored or the data may be retrieved via the communications interface 415 and stored in the memory 405.

As mentioned above, the processing circuitry 218 may be embodied in a number of different ways. For example, the processing circuitry 218 may be embodied as various processing means such as one or more processors 400 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 218 may be configured to execute instructions stored in the memory 405 or otherwise accessible to the processing circuitry 218. As such, whether configured by hardware or by a combination of hardware and software, the processing circuitry 218 may represent an entity (e.g., physically embodied in circuitry—in the form of processing circuitry 218) capable of performing operations according to example embodiments while configured accordingly. Thus, for example, when the processing circuitry 218 is embodied as an ASIC, FPGA, or the like, the processing circuitry 218 may be specifically configured hardware for conducting the operations described herein. Alternatively, as another example, when the processing circuitry 218 is embodied as an executor of software instructions, the instructions may specifically configure the processing circuitry 218 to perform the operations described herein.

The communications interface 415 may include one or more interface mechanisms for enabling communication with other devices external to the optical turbulence measurement device (e.g., optical turbulence measurement device 200), via, for example, network 420, which may, for example, be a local area network, the Internet, or the like, through a direct (wired or wireless) communication link to another external device, or the like. In some cases, the communications interface 415 may be any means such as a device or circuitry embodied in either hardware, or a combination of hardware and software that is configured to receive or transmit data from/to devices in communication with the processing circuitry 218. The communications interface 415 may be a wired or wireless interface and may support various communications protocols (WIFI, Bluetooth, NFC, cellular, Ethernet, or the like).

The device interface 410 may include one or more interface mechanisms for enabling communication with other external devices (e.g., output devices, input devices and/or the like) or internal functional components of the optical turbulence measurement device, including, for example, the camera assembly 216 and the optical source 212. According to some example embodiments, the device interface 410 may alternatively or additionally provide electrical power to the external devices (e.g., camera assembly 216, optical source 212, or the like) and may be configured, via the processor 400 to control electrical power provided to the external devices. In some cases, the device interface 410 may be any means such as a device or circuitry embodied in either hardware, or a combination of hardware and software that is configured to receive and/or transmit data from/to devices in communication with the processing circuitry 218.

According to some example embodiments, the processing circuitry 218, and more specifically, the processor 400 may be configured to perform various operation as described herein. In this regard, according to some example embodiments, the processing circuitry 218 may be configured to receive a data representation of the first received beam 205 and the second received beam 209 from the camera assembly 216 as described above. Further, the processing circuitry 218 may be configured to determine, based on the data representation, a focal spot displacement variance, as described further below, based on motion of a first focal spot corresponding to the first received beam 205 relative to a second focal spot corresponding to the second received beam 206. Additionally, the processing circuitry 218 may be configured to measure optical turbulence along a path of the source beam based on the focal spot displacement variance.

According to some example embodiments, the processing circuitry 218 may be configured to measure the optical turbulence based on a path-weighting function, as further described below, that varies over a distance from the first aperture 206 and the second aperture 210 to an origin of the source beam (e.g., optical source 110 or retroreflector 170). Further, according to some example embodiments, the processing circuitry 218 may also be configured to measure the optical turbulence based on a beam divergence correction function, as further described below. Additionally, according to some example embodiments, the processing circuitry 218 may also be configured to receive the data representation of the first received beam 205 and the second received beam 209 as a data representation of the composite beam 331. According to some example embodiments, the processing circuitry 218 may be configured to receive the data representation as a first data representation of the first received beam 205 from the first imager 308 and a second data representation of the second received beam 209 from the second imager 318.

Having described various system configurations and embodiments of the optical turbulence measurement device, the following describes more specific features and concepts of the configuration and operation of the systems and optical turbulence measurement devices to measure optical or atmospheric turbulence. In particular the following provides a description of how the image data or data representations from the one or more imagers may be analyzed, by the processing circuitry 218, to determine optical turbulence measurements. Further, where appropriate the description may refer to the optical turbulence measurement device 200, but one of skill in the art would appreciate that the techniques and approaches may be performed using any of the example optical turbulence measurement devices described herein within a bistatic or monostatic system configuration, as appropriate.

As mentioned above with respect to FIGS. 1A and 1B, an optical wave (e.g., the source beam 125 or the folded beam 166) traveling through a random optical turbulent medium (e.g., the turbulence field 120) exhibits fluctuations in both phase and amplitude due to the non-uniformity of the refractive field of the turbulent medium. By taking measurements of these fluctuations, the strength of the fluctuations over short intervals of time may be determined and thus an overall strength of the turbulent field can be characterized (e.g., using the refractive structure constant, $C_n^2$, or the Fried parameter, $r_0$). As such, the optical turbulence measurement device 200 may be configured to measure turbulence by quantifying secondary effects of the turbulence. Because turbulence can have an unpredictable and chaotic nature, turbulence can be difficult to measure directly, and therefore, according to some example embodiments, the optical turbulence measurement device 200 may be configured to measure the effect optical turbulence imparts upon waves in the form of a light beam (e.g., the source beam 125 or the folded beam 166) traveling within the turbulent medium. Using, according to some example embodiments, a differential motion monitor (DIMM) approach based on a dual-aperture device, such as the optical turbulence measurement device 200, fluctuations in the phase of the received light can be measured. Additionally, according to some example embodiments, an amplitude of the received light may also be measured. The amplitude and phase, together, can be used to determine an overall complex wave structure of received light, which can be related to the magnitude of the turbulent field. To determine the magnitude of the turbulent field, the processing circuitry 218 may apply a path-weighting function W(z) to process for generating the focal spot displacement variance or the DIMM analysis. In the absence of application of the path-weighting function in the DIMM analysis, the results may be more sensitive to turbulence that is at the end of the source beam path or closest to the optical turbulence measurement device 200. However, according to some example embodiments, the DIMM analysis may provide a path-averaged value that is weighted for turbulence that is closer to the optical turbulence measurement device 200, but could be corrected via a correction factor. The processing circuitry 218 may be configured to apply the path-weighting function to normalize the impact of turbulence throughout the source beam path to prevent turbulence that is close to the optical turbulence measurement device 200 from being weighed too heavily and skewing the measurements. As such, the processing circuitry 218 may be configured to measure the optical turbulence based on the path-weighting function, which may vary over a path of the source beam from the first aperture and the second aperture to an origin of the source beam (e.g., optical source 110 or retroreflector 170).

According to some example embodiments, the optical turbulence measurement device 200 may be implemented as a differential image motion monitor that is configured to measure $C_n^2$ values along an optical path of a source beam received by the optical turbulence measurement device 200. To do so, the processing circuitry 218 may be configured to measure angle-of-arrival (AoA) variations extracted from the received image data in the form of data representations of the first received beam 205 and the second received beam 209. The camera assembly 216, as described above, may receive magnified and directed portions of a source beam from two different apertures and generate data representations based on the same. The data representations for each portion of the source beam may cause respective focal spots within the images, and the relative movement of the focal spots may be captured for determining a focal spot displacement variance, which may be used to measure the optical turbulence.

Figure 5A:
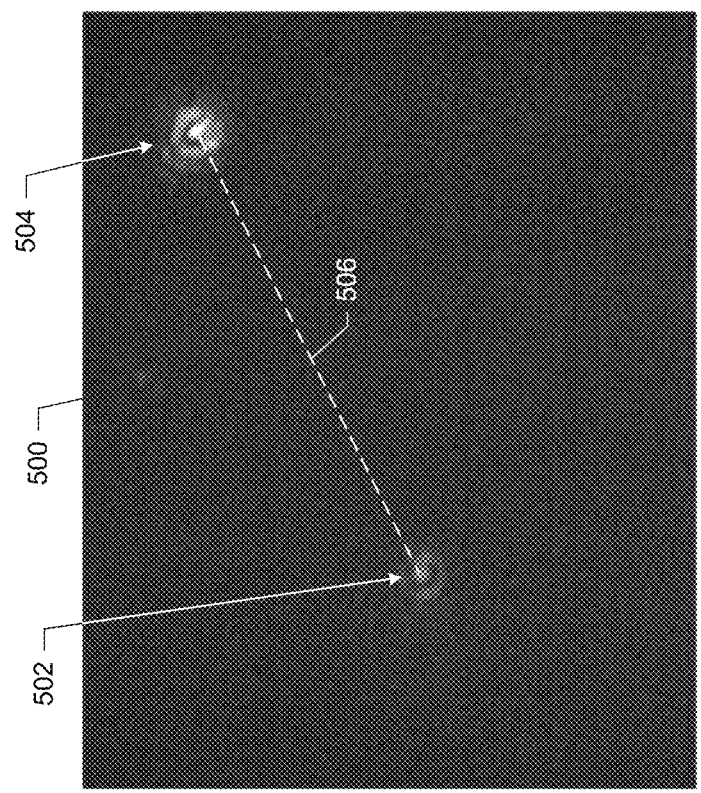
FIG. 5A illustrates a rendering of a focal spot image according to some example embodiments.

With reference to FIGS. 5A and 5B, two example renderings of such focal spot images are provided that may be used in the development of a focal spot displacement variance. In this regard, image 500 shows a weak turbulence condition ($C_n^2=10^{-16}$ m$^{-2/3}$). To determine a focal spot displacement variance, the processing circuitry 218 may be configured to identify the focal spots 502 and 504. Further, according to some example embodiments, a centroid of each focal spot 502 and 504 may be determined based on a light density analysis. Further, according to some example embodiments, the processing circuitry 218 may be configured to determine a distance 506 between the centroids of the of the focal spots 502 and 504 and monitor for uncorrelated movement of the centroids in the development of the focal spot displacement variance, which is indicative of the turbulence being experienced by the source beam. Accordingly, based on the developed focal spot displacement variance, a measurement of the optical turbulence along the path of the source beam may be obtained by the processing circuitry 218.

Similarly, FIG. 5B provides an example of a strong turbulence condition ($C_n^2=10^{-13}$ m$^{-2/3}$). In FIG. 5B, focal spots 512 and 514 are identified (with focal spot 512 being faint) as part of a process for developing a focal spot displacement variance. As mentioned above, according to some example embodiments, a centroid of each focal spot 512 and 514 may be determined based on a light density analysis. Further, a distance 516 between the centroids of the of the focal spots 512 and 514 may be determined and monitored for uncorrelated movement of the centroids by the processing circuitry 218, which, again, is indicative of the turbulence being experienced by the source beam to develop the focal spot displacement variance and a measurement of the optical turbulence along the path of the source beam.

As such, turbulence may cause the focal spots from each aperture (e.g., first aperture 206 and second aperture 210) to move about respective equilibrium positions (e.g., centroids) in uncorrelated motion due to AoA variations between the two apertures (i.e., across the received wavefront), which may be monitored by the processing circuitry 218. Relative motion (due to vibration) and misalignment between the source beam and apertures may result in correlated motion between the two focal spots, which does not affect the net displacement between centroids. The uncorrelated motion, however, is a result of turbulence in the form of inhomogeneities in the atmosphere that impacts the relative centroid displacement measurement. As such, according to some example embodiments, the approach may be reasonably tolerant to vibration or temporally varying misalignments between the source and the apertures.

The positions of two focal spots $\vec{x}_1$ and $\vec{x}_2$ within the imaging plane can be expressed as follows:

$$\vec{x}_1(t) = \vec{x}_{1,turb}(t) + \vec{x}_{1,vib}(t) + \langle \vec{x}_1 \rangle$$

$$\vec{x}_2(t) = \vec{x}_{2,turb}(t) + \vec{x}_{2,vib}(t) + \langle \vec{x} \rangle$$

where $\vec{r}_{turb}$ is displacement due to turbulence, $\vec{r}_{vib}$ is displacement due to mechanical vibrations or misalignments, and $\langle \vec{r} \rangle$ represents the equilibrium focal position (at a normal AoA). To calculate the displacement variance between the two focus locations due to turbulence, $$\sigma_\chi^2 = \text{Var}[\vec{x}_{1,turb}(t) - \vec{x}_{2,turb}(t)]$$
$$= \text{Var}[\vec{x}_1(t) - \vec{x}_{1,vib}(t) - \langle \vec{x}_1 \rangle - \vec{x}_2(t) + \vec{x}_{2,vib}(1) + \langle \vec{x}_2 \rangle]$$
$$= \text{Var}[\vec{x}_1(t) - \vec{x}_2(t)]$$

The vibration terms can cancel because the apertures share a common structure (e.g., support structure 202), and therefore an assumption can be made that the vibration terms are equal in direction and magnitude, and perfectly time correlated. The equilibrium terms can also be removed because the equilibrium terms are constant. Therefore, adding the equilibrium terms to the set of measurements does not affect the variance. As a result of using multiple apertures, the displacement variance caused by turbulence may be equal to the total measured displacement variance.

Figure 6:
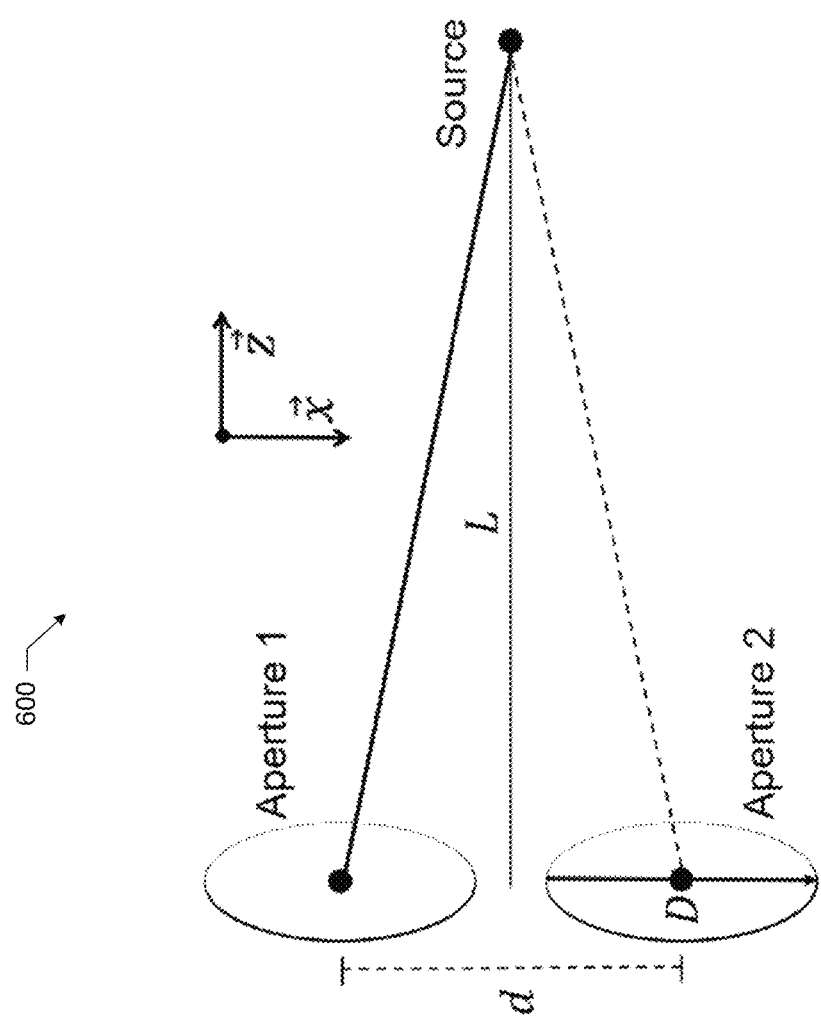
FIG. 6 illustrates a conceptual two aperture device according to some example embodiments.
Figure 7:
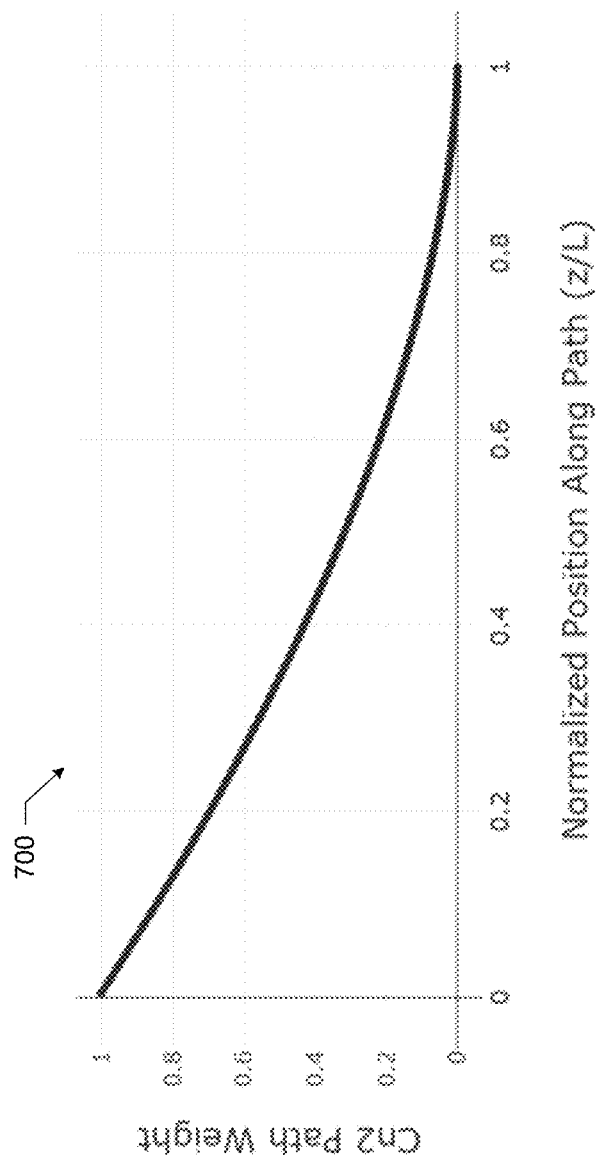
FIG. 7 illustrates a graph of a path-weighting function according to some example embodiments.

Further, to relate the measured value $\sigma_\chi^2$ to the strength of the turbulence along the path of the source beam, a theoretical framework may be employed. Such a framework may be described in the context of a two aperture device (e.g., optical turbulence measurement device 200), represented in FIG. 6 at 600, with aperture diameter D, and aperture spacing d. In order to express the mean AoA over each aperture, the distorted wavefront associated with the two apertures may be represented in terms of Zernike polynomials. The first order Zernike coefficients (tilt) may affect the focal spot displacement much more than higher order terms. For this configuration, the covariance of the Zernike x-tilt coefficients for the two apertures, $a_1$ and $a_2$, may be given by:

$$\langle a_1 a_2 \rangle = 16\sqrt{3}\,\Gamma(8/3)\left(\frac{2\pi}{\lambda}\right)^2 D^{5/3} L \int_0^1 C_n^2(uL) W(u) du$$

where $\lambda$ is the wavelength, $u=z/L$ is the normalized position along the path, and $W(u)$ is a $C_n^2$ path-weighting function that identifies where along the path the optical turbulence measurement device is the most sensitive. As such the path-weighting function may be defined as:

$$W(u) = \frac{[\alpha(u)]^{11/3}}{(1-u)^{-2}} \int_0^\infty \gamma^{-14/3} J_2^2[\beta\gamma]\{J_0(\gamma) - J_2(\gamma)\} d\gamma$$

where $\alpha=d(1-u)/D$ and $\beta$ and $\beta=D/2d$. From this equation it can clearly be seen that the result of the integral is not a function of path position, but rather a constant which augments $W(u)$. As such, for the case of a two aperture device (e.g., optical turbulence measurement device 200) and a single source for the source beam received by the two aperture device, the weighting function can be proportional to $(1-u)^{5/3}$ as shown in the graph 700 of FIG. 7. As can be seen in the graph 700, u is increasing from aperture (u=0) to source (u=1), which implies that turbulence close to the optical turbulence measurement device will contribute most to the overall measurement, while turbulence at the source of the source beam will have the least effect. A spatial correlation function has therefore been derived for Zernike tilt coefficients between finite apertures, which can be related back to the variance in focal spot displacement in the following manner:

$$\sigma_X^2 = f^2 \langle \phi_1 \phi_2 \rangle$$

$$= \left(\frac{\pi f \lambda}{2D}\right)^2 \langle a_1 a_2 \rangle$$

$$= 16\sqrt{3}\, \Gamma(8/3) \left(\frac{\pi^4 f^2}{D^{1/3}}\right) L \int_0^1 C_n^2(uL) W(u) du$$

Accordingly, an expression is derived that can relate an experimentally measured displacement variance with the strength of turbulence along the path. Additionally, $\sigma_X^2$ is independent of the wavelength of the source beam, which is generally assumed valid in regimes of both weak and strong turbulence. The above equation expresses a focal plane displacement variance and illustrates the use of the path-weighting function. When assuming the turbulence is uniform along the path, the optical turbulence measurement device is in the near-field limit of the source beam, and the source beam is an in infinite plane wave, the focal plane variance can be expressed more simply by:

$$\sigma_X^2 = 11.63 \frac{\overline{C_n^2} f^2 L}{D^{1/3}} \left[ 1 - \frac{25}{36} \left(\frac{D}{d}\right)^{1/3} \right]$$

which includes the path-weighting function contained within the path-averaged structure constant $\overline{C_n^2}$, which can be expressed as $$\overline{C_n^2} = \int_0^1 C_n^2(uL)(1-u)^{5/3} du$$

The assumptions made to arrive at these expressions are adequate because the results obtained using the equations produce similar numbers in implementations where, for example, the source beam is a laser with low divergence, which approximates a plane wave, and the optical turbulence measurement device 200 has a center-to-center aperture spacing of 0.30 m. As such, the optical turbulence measurement device 200 may be operating in the near field of the source beam when the optical path is less than approximately 100 km.

Figure 8:
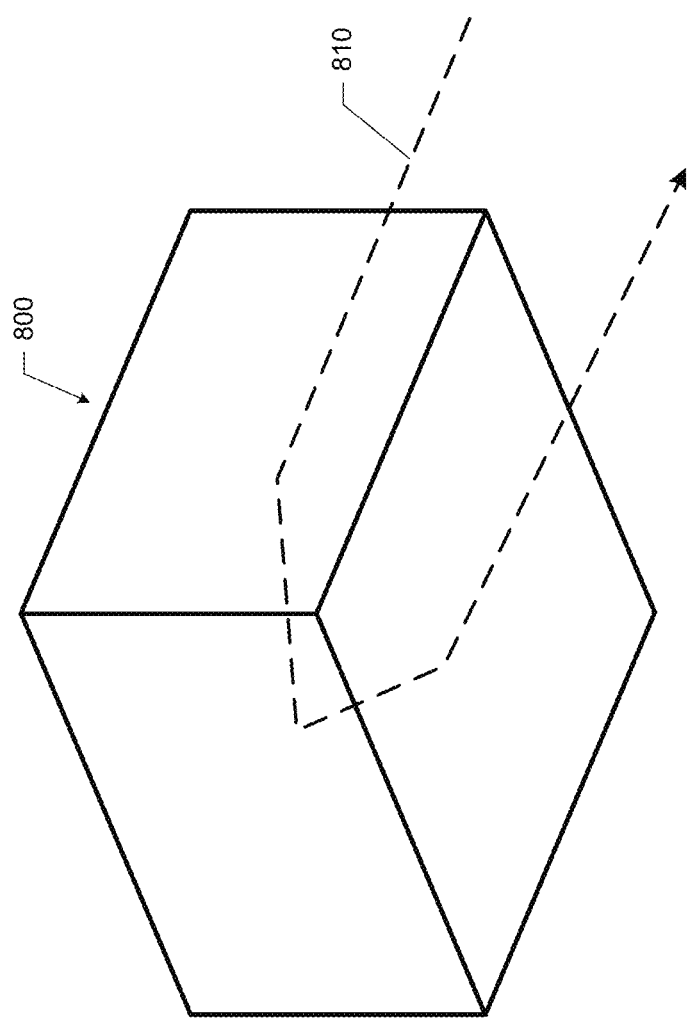
FIG. 8 illustrates an example retroreflector according to some example embodiments.

As mentioned above, in monostatic turbulence measurement systems, such as system 101, the retroreflector 170 may be used to fold the output beam 160 onto itself with the source beam 165 to form the folded beam 166. To perform this reflecting or folding operation, the retroreflector 170 may include a pattern on the reflective surfaces. In some example embodiments, the retroreflector 170 may be a cornercube, such as the cornercube 800 shown in FIG. 8. As illustrated in FIG. 8, an example beam 810 (e.g., source beam 165) that is incident on one of the surfaces of the cornercube 800 may reflect off of the other surfaces of the cornercube 800 and be returned to the origin of the beam 810 (where the spacing between the incoming beam and the outgoing beam being provided for illustration purposes). The cornercube 800 may be one example of a retroreflector that may be used according to some example embodiments. Other examples of retroreflectors may include non-linear retroreflectors, cat's eye reflectors, and other types of corner reflectors.

In operation, the retroreflector 170 may introduce diffractive effects caused by the finite aperture at the retroreflector plane. The diffractive affect may impact the angle-of-arrival fluctuations at the source/receiver plane formed by the co-located optical source and the dual-apertures. If the beam waist (or width) at the retroreflector $\omega_L$ is greater than or equal to the radius of the retroreflector enclosure $r_{retro}$, than the inner circular area will be inverted and reflected back, causing a diffraction pattern to appear at the optical turbulence measurement device 200. The Fresnel number $N_F$ is a dimensionless quantity which establishes a rough criterion for whether the propagation should be treated with the near-field or far-field diffraction approximations. As such, using a large sized retroreflector at moderate distances (1 km-10 km), $N_F \gg 1$, the diffraction will be near-field because:

$$N_F = \frac{(r_{retro})^2}{\lambda L}$$

The Fresnel number may also describe the number of half-period zones or Fresnel zones that fit within a circular area (centered on the optical axis) described by the specified radius. For two aperture devices, the two apertures are sampling sections of the wavefront (source beam) that are off-axis from the center of the diffraction pattern, and not necessarily radially symmetric. As such, to ignore diffractive effects, the Fresnel zone density within the sampled area of the apertures should be large enough, such that the half-period zones approximately average to zero. Additionally, the aperture size of the retroreflector may have little or no effect on the turbulence determinations.

Following from the description above, according to some example embodiments, the diameter of the source beam and the diameter of the retroreflector may be the same or similar to the aperture separation distance, B, or the path length may be large enough that the source beam can diverge to approximately B. According to some example embodiments, if the beam waist (width) is not at least equal to B at the aperture plane, the source beam may not be captured by both apertures simultaneously. To address this issue, a large diameter retroreflector may be employed. However, the prohibitive high cost of large diameter retroreflectors makes use such retroreflectors with a well-collimated source not ideal. However, implementing a diverging Gaussian beam allows for a much smaller initial beam radius $W_0$, as well as a smaller retroreflector radius $W_R$ for a given path length L. Defining f as the focus position of the source beam (negative for diverging source), and $\theta_{di\!f\!f}$ as the divergence due to diffraction, the constraint can be expressed as:

$$B \ll \sqrt{\left[W_R\left(1 - \frac{L}{f}\right)\right]^2 + \theta_{diff}^2 L^2}$$

One consequence of using a diverging beam as the source beam may be that the source beam's level of interaction with the atmosphere changes as the source beam propagates forward. However, significant rms wavefront error generally does not occur until the beam diameter becomes appreciably larger than the inner turbulent scale length $l_0$. To further isolate the effect of beam divergence on the turbulence measurement system, the atmospheric structure parameter $C_n^2$ may be assumed to be constant for the analysis. As such, although the level of turbulence is not changing, as the diverging source beam may propagate horizontally through the atmosphere and the amount of phase distortion accumulated by the source beam may scale with the increase in beam size.

Initially, the coherence length $r_0$ may be defined in terms of path parameters to determine the impact of beam divergence on $C_n^2$. According to some example embodiments, for the optical turbulence measurement device 200, $r_0$ may be calculated from measurements on the statistical variance on the focal spot separation, $\sigma_{xy}$. The coherence length $r_0$ (also called the Fried parameter) is defined as the diameter of a circular area over which the rms wavefront aberration is equal to 1 radian after propagating a path length, L, through the atmosphere. For a given wavenumber $k_0$ and assuming a horizontal path, the Fried parameter can be calculated for a diverging beam using the generalized Gaussian beam parameters $\Theta$ and $\Lambda$ to account for refraction and diffraction respectively:

$$r_0 = 2.1\rho_0 = \left[0.160\overline{C}_n^2 k_0^2 L\left(\left(\frac{1-\Theta^{8/3}}{1-\Theta}\right) + 0.62\Lambda^{11/6}\right)\right]^{-3/5}$$

Defining $F_0$ as the phase front radius of curvature at the transmitting aperture (e.g., optical output port 213 of the optical source 212), the generalized Gaussian beam parameters may be expressed as:

$$\Theta_0 = 1 - \frac{L}{F_0}$$

$$\Lambda_0 = \frac{2L}{k_0 W_0^2}$$

$$\Theta = \frac{\Theta_0}{\Theta_0^2 + \Lambda_0^2}$$

$$\Lambda = \frac{\Lambda_0}{\Theta_0^2 + \Lambda_0^2}$$

Solving for the path-averaged structure constant yields:

$$\overline{C}_n^2 = \left[0.160 k_0^2 r_0^{5/3} L\left(\left(\frac{1-\Theta^{8/3}}{1-\Theta}\right) + 0.62\Lambda^{11/6}\right)\right]^{-1}$$

Since $\ddot{C}_2^n$ is assumed constant for the case of horizontal propagation, as the divergence of the beam is varied, the observed coherence length changes in order to accommodate.

Figure 9:
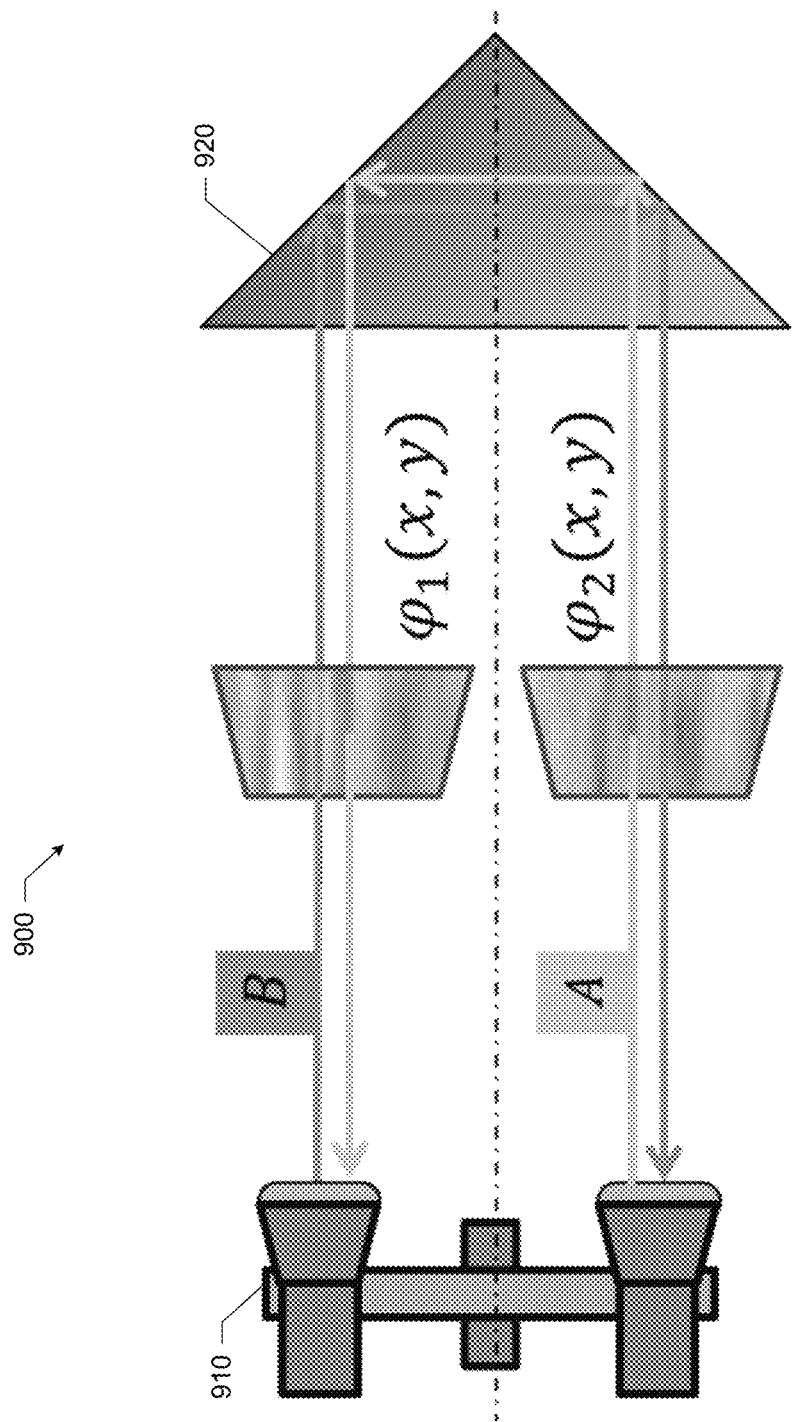
FIG. 9 illustrates a conceptual monostatic system according to some example embodiments.

When using a retroreflector in a monostatic system (e.g., system 101), the optical path that the source beam travels is twice the physical distance to the retroreflector. As mentioned above, while the folded beam is propagating, the refractive inhomogeneities along the path can be considered static since the beam is propagating at the speed of light, in effect causing the beam to experience identical inverted turbulent paths. FIG. 9 illustrates an example monostatic system 900 that comprises a optical turbulence measurement device 910, according to some example embodiments, and a retroreflector 920. FIG. 9 also depicts the propagation geometry for the case in which the folded beam is an infinite plane wave. In this special case the sampled beam sections which pass through apertures A and B have each traversed the same path through the atmosphere, albeit in opposite directions.

The effect of folded-path propagation of the beam may amplify the apparent differential image motion recorded by the optical turbulence measurement device, allowing for the detection of even lower turbulence levels than possible, for example, with a system in a bistatic configuration. In this regard, the phase error across the wavefront $\varphi$ (x, y) may be sampled at apertures A and B of the optical turbulence measurement device 910. For the special case when the source is an infinite plane wave, the gradients of the phase error can be expressed as:

$$\vec{\nabla}_{\phi A}(\vec{x}) = \vec{\nabla}(\phi_2(\vec{x}) - \phi_1(\vec{x}))$$
$$= \|\vec{\nabla}\phi_2(\vec{x})\| \cdot \hat{u}_2 - \|\vec{\nabla}\phi_1(\vec{x})\| \cdot \hat{u}_1$$
$$= \|\vec{\nabla}_{\phi A}(\vec{x})\| \cdot \hat{u}_A$$

$$\vec{\nabla}_{\phi B}(\vec{x}) = \vec{\nabla}(\phi_1(\vec{x}) - \phi_2(\vec{x}))$$
$$= -(\|\vec{\nabla}\phi_2(\vec{x})\| \cdot \hat{u}_2 - \|\vec{\nabla}\phi_1(\vec{x})\| \cdot \hat{u}_1)$$
$$= \|\vec{\nabla}_{\phi A}(\vec{x})\| \cdot (-\hat{u}_A)$$

As such, as a result of folded-path propagation, the phase gradient of the beam at the two apertures may be equal in magnitude and opposite in direction. The angle-of-arrival $\alpha$ may be approximately equal to the average gradient of the wave corrugation function over the circular aperture using the small angle approximation:

$$\alpha = \tan\left(\frac{\lambda}{2\pi}\|\vec{\nabla}_\phi(\vec{x})_{avg}\|\right) \approx \left(\frac{\lambda}{2\pi}\right)\left(\frac{1}{\pi R^2}\right)\int\int_A \vec{\nabla}_\phi(\vec{x}) dA$$

Relating the resulting displacement of each focal spot to $\alpha$ and the effective focal length f of the optical turbulence measurement device, the magnitude of the differential displacement can be determined as:

$$\|d_{XY}\| = \sqrt{(f\alpha_A)^2 + (f\alpha_B)^2}$$
$$= f\sqrt{2}\,\alpha_A$$

The statistical variance of the differential displacement may be used to calculate $C_n^2$, and can be expressed in terms of the rms angle-of-arrival. By taking the ratio of the displacement variance for folded-path propagation to that of single path (for equal optical paths L), the amplification attributed to the retroreflector of the apparent motion between the focal spots can be seen:

$$\langle \alpha_L^2 \rangle = 2.91 C_n^2 L(2W_G)^{-1/3}$$

$$\frac{\langle \sigma_{XY}^2 \rangle_{folded}}{\langle \sigma_{XY}^2 \rangle_{single}} = \frac{2f^2 \langle \alpha_L^2 \rangle}{f^2 \langle \alpha_L^2 \rangle} = 2$$

As such, the differential motion on the imager may be magnified by a factor of two. However, this result may be a best case, when the source beam can be approximated as a plane wave, and for moderate to short range optical paths. In this heavily simplified case, the approximation assumes that the beams sampled by apertures A and B have propagated in opposite directions through identical sections of atmosphere.

Such an assumption becomes less valid as the source beam begins to diverge strongly, or when the optical path length becomes large.

The directional amplification in phase error from a folded path source beam may be analogous to the enhanced backscatter effect, in which on-axis laser irradiance is observed to increase after reflecting off a cooperative target and constructively interfering with itself. When calculating the on-axis scintillation index $\sigma_{I,i}^2(r, 2L)$ as a beam divergence correction function for folded-path propagation off of a retroreflector, the index may be expressed as the sum of three components: the contribution from the outbound beam $\sigma_{I,i}^2(r, L)$, the contribution from the return beam $\sigma_{I,beam}^2(r, L)$, and an additional contribution $C_I^{iR}(r, L)$ from the correlation function between the two. In other words, $$\sigma_{I,i}^2(r;2L) = \sigma_{I,i}^2(r;L) + \sigma_{I,beam}^2(r;L) + 2C_I^{iR}(r;L)$$

In a similar fashion, the amplification of differential image motion observed when using a folded-path monostatic system arises from the correlation, or spatial overlap of the optical beams that get subsampled by each aperture of the optical turbulence measurement device. When perfectly correlated, the enhancement in the differential image motion is increased by a factor of two. However, beams that diverge tend to have a small correlation function, and thus the way in which such beams accumulate phase error can generally be treated the same as single path propagation, neglecting the additional contribution $C_I^{iR}(r,L)$ from the correlation function. The result may be a beam divergence correction function that may be applied by the processing circuitry 218 as part of an optical turbulence measurement.

Additionally, as mentioned above, diffractive effects may not impact a turbulence measurement because the calculation relies on the variance in differential image motion, and any static offsets in the focal spots caused by diffractive effects would not result in relative movement of the focal spots. However, a change in the diffraction pattern relative to the apertures may cause a change. In this regard, for example, vibration, thermal expansion, and mount drift may cause the diffraction pattern to shift in relation to the apertures, which in turn may cause the focal position offsets to also change. Bistatic system configurations may be particularly susceptible to such a shift in the diffraction pattern. In this regard, for example, if a significant shift is expected to occur during a data acquisition period, the variance may be artificially inflated. Having a high Fresnel zone density may ensure that even if a large shift should occur, the ensemble phase average over the apertures (from diffraction) may still be approximately zero.

Figure 10:
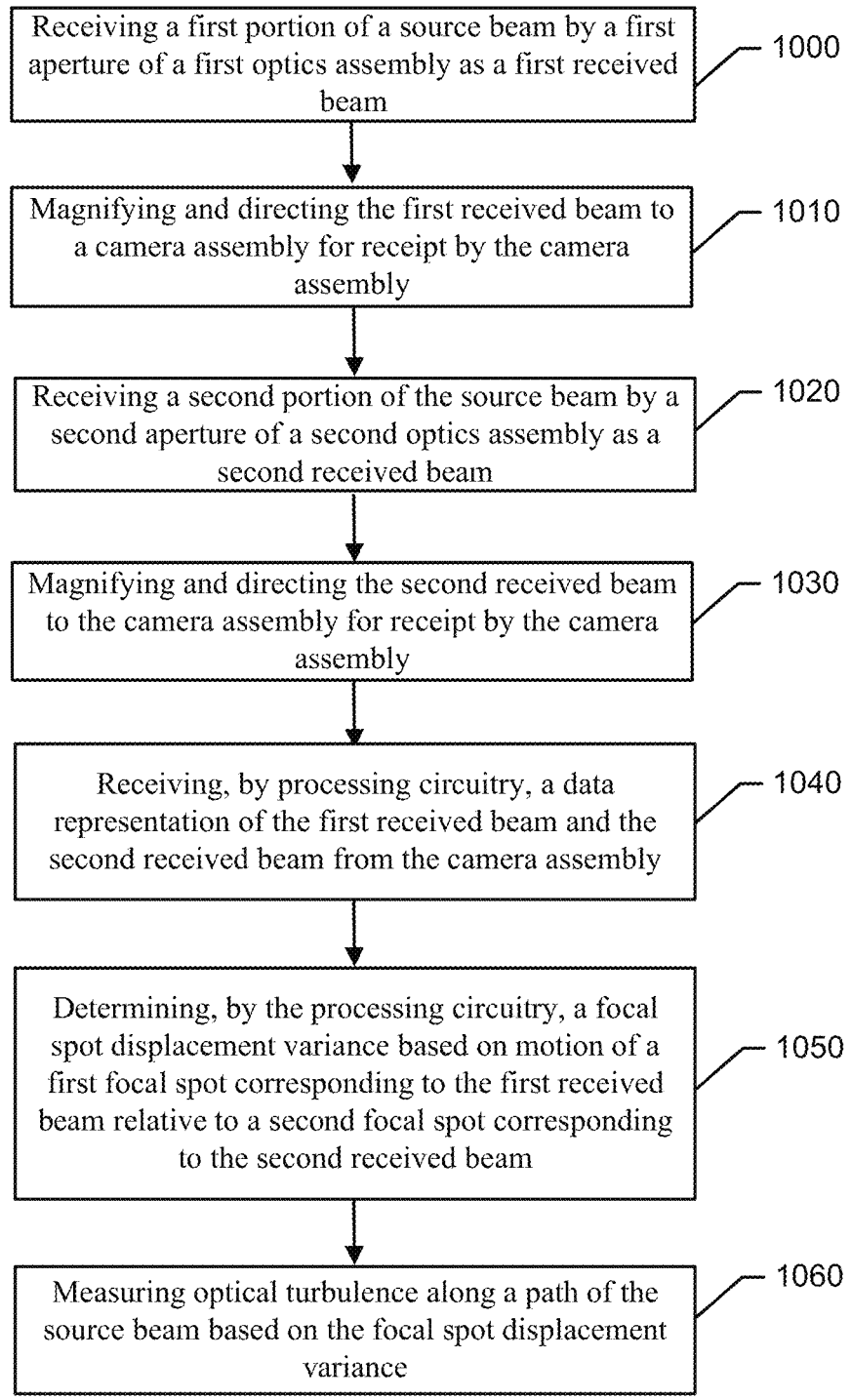
FIG. 10 illustrates a flow chart of an example method for measuring optical turbulence processing according to some example embodiments.

In view of the foregoing, FIG. 10 illustrates an example method for measuring optical turbulence according to some example embodiments. According to some example embodiments, the example method of FIG. 10 may be performed by the optical turbulence measurement device 200. In this regard, the example method may comprise, at 1000, receiving a first portion of a source beam by a first aperture of a first optics assembly as a first received beam, and, at 1010, magnifying and directing the first received beam to a camera assembly for receipt by the camera assembly. Additionally, the example method may comprise, at 1020, receiving a second portion of the source beam by a second aperture of a second optics assembly as a second received beam, and, at 1030, magnifying and directing the second received beam to the camera assembly for receipt by the camera assembly. Further, the example method may comprise, at 1040, receiving, by processing circuitry, a data representation of the first received beam and the second received beam from the camera assembly, at 1050, determining, by the processing circuitry, a focal spot displacement variance based on motion of a first focal spot corresponding to the first received beam relative to a second focal spot corresponding to the second received beam, and, at 1070, measuring optical turbulence along a path of the source beam based on the focal spot displacement variance.

Additionally, according to some example embodiments, the example method may comprise generating an output beam from a laser source co-located with the first optics assembly and the second optics assembly, and reflecting the output beam by a retroreflector to be received by the first aperture and the second aperture as the source beam. Additionally or alternatively, according to some example embodiments, the retroreflector may comprise a cornercube retroreflector. Additionally or alternatively, according to some example embodiments, the example method may comprise measuring the optical turbulence based on a path-weighting function that varies over a distance from the first aperture and the second aperture to an origin of the source beam. Additionally or alternatively, according to some example embodiments, the example method may comprise receiving and combining the first received beam and the second received beam by an optical wedge to form a composite beam for receipt by an imager of the camera assembly, and receiving the data representation as a data representation of the composite beam. Additionally or alternatively, according to some example embodiments, the example method may comprise receiving the first received beam at a first imager corresponding to the first aperture, receiving the second received beam at a second imager corresponding to the second aperture, and receiving the data representation as a first data representation of the first received beam from the first imager and a second data representation of the second received beam from the second imager. Additionally or alternatively, according to some example embodiments, the first aperture and the second aperture are oriented along a ground-based optical path. Additionally or alternatively, according to some example embodiments, the example method may comprise measuring the optical turbulence based on a beam divergence correction function.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all That which is claimed:

1. An optical turbulence measurement system comprising:
a support structure;
a camera assembly coupled to the support structure;
a first optics assembly coupled to the support structure, the first optics assembly being configured to magnify and direct a first portion of a source beam received by a first aperture of the first optics assembly to the camera assembly to be received as a first received beam;
a second optics assembly coupled to the support structure, the second optics assembly being configured to magnify and direct a second portion of the source beam received by a second aperture of the second optics assembly to the camera assembly to be received as a second received beam; and
processing circuitry in communication with the camera assembly, the processing circuitry configured to:
receive a data representation of the first received beam and the second received beam from the camera assembly;
determine, based on the data representation, a focal spot displacement variance based on motion of a first focal spot corresponding to the first received beam relative to a second focal spot corresponding to the second received beam; and
measure optical turbulence along a path of the source beam based on the focal spot displacement variance.

2. The optical turbulence measurement system of claim 1, further comprising:
an optical source coupled to the support structure and configured to generate an output beam; and
a retroreflector located a retroreflector distance away from the optical source, the retroreflector configured to reflect the output beam to be received by the first aperture and the second aperture as the source beam.

3. The optical turbulence measurement system of claim 2, wherein the retroreflector comprises a cornercube retroreflector.

4. The optical turbulence measurement system of claim 2, wherein the processing circuitry is configured to measure the optical turbulence based on a path-weighting function that varies over a distance from the first aperture and the second aperture to an origin of the source beam.

5. The optical turbulence measurement system of claim 1, wherein the camera assembly comprises an optical wedge and an imager;
wherein the optical wedge is configured to receive and combine the first received beam and second received beam to form a composite beam for receipt by the imager;
wherein processing circuitry is configured to receive the data representation of the first received beam and the second received beam as a data representation of the composite beam.

6. The optical turbulence measurement system of claim 1, wherein the camera assembly comprises:
a first imager corresponding to the first aperture and configured to receive the first received beam; and
a second imager corresponding to the second aperture and configured to receive the second received beam;
wherein the processing circuitry is configured to receive the data representation as a first data representation of the first received beam from the first imager and a second data representation of the second received beam from the second imager.

7. The optical turbulence measurement system of claim 1, wherein the first aperture and the second aperture are oriented along a ground-based optical path.

8. The optical turbulence measurement system of claim 1, wherein the processing circuitry is configured to measure the optical turbulence based on a beam divergence correction function.

9. A method comprising:
receiving a first portion of a source beam by a first aperture of a first optics assembly as a first received beam;
magnifying and directing the first received beam to a camera assembly for receipt by the camera assembly;
receiving a second portion of the source beam by a second aperture of a second optics assembly as a second received beam;
magnifying and directing the second received beam to the camera assembly for receipt by the camera assembly;
receiving, by processing circuitry, a data representation of the first received beam and the second received beam from the camera assembly;
determining, by the processing circuitry, a focal spot displacement variance based on motion of a first focal spot corresponding to the first received beam relative to a second focal spot corresponding to the second received beam; and
measuring optical turbulence along a path of the source beam based on the focal spot displacement variance.

10. The method of claim 9, further comprising:
generating an output beam from a laser source co-located with the first optics assembly and the second optics assembly; and
reflecting the output beam by a retroreflector to be received by the first aperture and the second aperture as the source beam.

11. The method claim 10, wherein the retroreflector comprises a cornercube retroreflector.

12. The method of claim 10, further comprising measuring the optical turbulence based on a path-weighting function that varies over a distance from the first aperture and the second aperture to an origin of the source beam.

13. The method of claim 9, further comprising:
receiving and combining the first received beam and the second received beam by an optical wedge to form a composite beam for receipt by an imager of the camera assembly; and
receiving the data representation as a data representation of the composite beam.

14. The method of claim 9, further comprising:
receiving the first received beam at a first imager corresponding to the first aperture;
receiving the second received beam at a second imager corresponding to the second aperture; and
receiving the data representation as a first data representation of the first received beam from the first imager and a second data representation of the second received beam from the second imager.

15. The method of claim 9, wherein the first aperture and the second aperture are oriented along a ground-based optical path.

16. The method of claim 9, further comprising measuring the optical turbulence based on a beam divergence correction function.

17. A system comprising:
an optical turbulence measurement device comprising:
- a support structure;
- a camera assembly coupled to the support structure;
- a first optics assembly coupled to the support structure, the first optics assembly being configured to magnify and direct a first portion of a source beam received by a first aperture of the first optics assembly to the camera assembly to be received as a first received beam;
- a second optics assembly coupled to the support structure, the second optics assembly being configured to magnify and direct a second portion of the source beam received by a second aperture of the second optics assembly to the camera assembly to be received as a second received beam;
- an optical source coupled to the support structure and configured to generate an output beam; and
- processing circuitry; and a retroreflector located a retroreflector distance away from the optical source, the retroreflector configured to reflect the output beam to be received by the first aperture and the second aperture as the source beam;
wherein the processing circuitry is configured to:
- receive a data representation of the first received beam and the second received beam from the camera assembly;
- determine, based on the data representation, a focal spot displacement variance based on motion of a first focal spot corresponding to the first received beam relative to a second focal spot corresponding to the second received beam; and
- measure optical turbulence along a path of the source beam based on the focal spot displacement variance and a path-weighting function that varies over the retroreflector distance.

18. The system of claim 17, wherein the retroreflector comprises a cornercube retroreflector.

19. The system of claim 17, wherein the processing circuitry is configured to measure the optical turbulence based on a beam divergence correction function.

20. The system of claim 17, wherein the camera assembly comprises:
- a first imager corresponding to the first aperture and configured to receive the first received beam; and
- a second imager corresponding to the second aperture and configured to receive the second received beam;
wherein the processing circuitry is configured to receive the data representation as a first data representation of the first received beam from the first imager and a second data representation of the second received beam from the second imager.

* * * * *